(12) United States Patent
Lewis et al.

(10) Patent No.: US 8,694,475 B2
(45) Date of Patent: Apr. 8, 2014

(54) METHOD AND APPARATUS FOR SITUATION-BASED MANAGEMENT

(75) Inventors: Lundy M. Lewis, Mason, NH (US); Gabriel Jakobson, Brookline, MA (US); John F Buford, Princeton, NJ (US)

(73) Assignee: Altusys Corp., Princeton, NJ (US)

( * ) Notice: Subject to any disclaimer, the term of this patent is extended or adjusted under 35 U.S.C. 154(b) by 1863 days.

(21) Appl. No.: 10/907,483

(22) Filed: Apr. 2, 2005

(65) Prior Publication Data

US 2005/0228763 A1 Oct. 13, 2005

Related U.S. Application Data

(60) Provisional application No. 60/558,828, filed on Apr. 3, 2004.

(51) Int. Cl.
*G06F 7/00* (2006.01)

(52) U.S. Cl.
USPC .......................................... 707/694; 707/792

(58) Field of Classification Search
USPC ......... 707/1–104.1, 694, 792, 636; 705/7, 35; 386/296; 709/213; 719/318
See application file for complete search history.

(56) References Cited

U.S. PATENT DOCUMENTS

| | | | |
|---|---|---|---|
| 4,713,806 A * | 12/1987 | Oberlander et al. | 370/358 |
| 4,720,850 A * | 1/1988 | Oberlander et al. | 379/90.01 |
| 5,546,598 A | 8/1996 | Yamaguchi et al. | |
| 5,557,798 A * | 9/1996 | Skeen et al. | 705/35 |
| 5,581,664 A | 12/1996 | Allen et al. | |
| 5,666,481 A | 9/1997 | Lewis | |
| 5,715,374 A | 2/1998 | Heckerman et al. | |
| 5,724,537 A * | 3/1998 | Jones | 711/1 |
| 5,748,098 A | 5/1998 | Grace | |
| 5,852,814 A | 12/1998 | Allen | |
| 6,081,798 A | 6/2000 | Johnson et al. | |
| 6,085,233 A * | 7/2000 | Jeffrey et al. | 709/216 |
| 6,212,528 B1 | 4/2001 | Brophy et al. | |
| 6,240,529 B1 | 5/2001 | Kato | |
| 6,249,755 B1 | 6/2001 | Yemini et al. | |
| 6,253,339 B1 | 6/2001 | Tse et al. | |
| 6,336,139 B1 | 1/2002 | Feridun et al. | |
| 6,396,535 B1 | 5/2002 | Waters | |

(Continued)

OTHER PUBLICATIONS

U.S. Patent and Trademark Office, "Advisory Action", "from U.S. Appl. No. 10/907,484", Jun. 1, 2010, pp. 1-3, Published in: US.

(Continued)

*Primary Examiner* — James Trujillo
*Assistant Examiner* — Linh Black
(74) *Attorney, Agent, or Firm* — Fogg & Powers LLC

(57) ABSTRACT

Method and apparatus for situation-based management of natural and artificial systems using event correlation and a situation manager. Input is provided from multiple sources in the form of a collection of events. A first level of processing performs event correlation over the collection of events and infers new events and new qualities of events. A second level of processing manages situations based on the collection of events, where situations are recognized, maintained, and given a degree of confidence. Situations are periodically updated based on incoming events. The assertion of a situation may call for information from external sources, provide information for external sources, and provide control instructions to external sources. Given a current situation, past, and possible future situations are inferred. Additionally, a method and apparatus for bi-directional communication between the event correlator and situation manager.

16 Claims, 12 Drawing Sheets

(56) References Cited

U.S. PATENT DOCUMENTS

| | | | |
|---|---|---|---|
| 6,400,996 B1* | 6/2002 | Hoffberg et al. | 700/83 |
| 6,408,404 B1 | 6/2002 | Ladwig | |
| 6,434,590 B1 | 8/2002 | Blelloch et al. | |
| 6,470,272 B2 | 10/2002 | Cong et al. | |
| 6,529,948 B1* | 3/2003 | Bowman-Amuah | 709/217 |
| 6,532,554 B1 | 3/2003 | Kakadia | |
| 6,571,251 B1 | 5/2003 | Koski et al. | |
| 6,604,093 B1 | 8/2003 | Etzion et al. | |
| 6,606,660 B1* | 8/2003 | Bowman-Amuah | 709/227 |
| 6,629,106 B1 | 9/2003 | Narayanaswamy et al. | |
| 6,701,195 B2 | 3/2004 | Brown et al. | |
| 6,842,877 B2 | 1/2005 | Robarts et al. | |
| 7,124,101 B1* | 10/2006 | Mikurak | 705/35 |
| 7,277,448 B1 | 10/2007 | Long et al. | |
| 2003/0046582 A1 | 3/2003 | Black et al. | |
| 2003/0107596 A1* | 6/2003 | Jameson | 345/762 |
| 2003/0204491 A1 | 10/2003 | Botzer et al. | |
| 2004/0003132 A1* | 1/2004 | Stanley et al. | 709/316 |
| 2004/0034795 A1* | 2/2004 | Anderson et al. | 713/201 |
| 2004/0049698 A1 | 3/2004 | Ott et al. | |
| 2004/0064351 A1* | 4/2004 | Mikurak | 705/7 |
| 2004/0093340 A1* | 5/2004 | Edmondson et al. | 707/101 |
| 2004/0128295 A1 | 7/2004 | Adi et al. | |
| 2004/0158549 A1* | 8/2004 | Matena et al. | 707/1 |
| 2005/0091226 A1* | 4/2005 | Lin et al. | 707/100 |

OTHER PUBLICATIONS

U.S. Patent and Trademark Office, "Patent Board Decision", "from U.S. Appl. No. 10/907,484", Sep. 24, 2013, pp. 1-7, Published in: US.

U.S. Patent and Trademark Office, "Final Office Action", "from U.S. Appl. No. 10/907,484", Feb. 2, 2010, pp. 1-20, Published in: US.

U.S. Patent and Trademark Office, "Office Action", "from U.S. Appl. No. 10/907,484", May 12, 2009, pp. 1-16, Published in: US.

* cited by examiner

METHOD AND APPARATUS FOR SITUATION-BASED MANAGEMENT

This application claims priority to the U.S. provisional Patent Application Ser. No. 60/558,828 filed Apr. 3, 2004 entitled METHOD AND APPARATUS FOR INTEGRATED COGNITIVE FUSION . . . by Gabriel Jakobson, Lundy M. Lewis, and John F. Buford.

BACKGROUND OF THE INVENTION

The ability to automatically monitor and manage dynamic situations is needed in many application domains. Examples include management of real-time environments such as tactical battlefields, public safety and health-care systems during disaster response, trading in global financial markets, services provided by large-scale telecommunications networks, homeland defense, industrial infrastructure security, and urban infrastructure security. These domains involve a large number of objects that change their states in time and space, and these objects may involve each other in complex spatio-temporal, structural, connectivity, causal, and domain-specific relations. These domains also may involve a large number of informational objects which are stored in databases or distributed as web content. A large amount of information is collected about the objects using sources such as notifications from remote equipment, sensors, probes, surveillance equipment, distributed networked data processing systems, and reports from field personnel, intelligence information, news media, and other observers. This information is collected over one or more data networks, typically in large volumes, for possible storage and for automated analysis using signal and data processing equipment.

From the management viewpoint it is important that the highest priority or most relevant situations be immediately and continuously viewable. Furthermore it must be possible for personnel who view the priority or most relevant situations to see the context and attributes of the situations, to view emerging trends and potential threats or risks, and to initiate actions that lead to preferred or safe situations.

There are a number of approaches available for monitoring and management of these types of application domains. These approaches typically are implemented in software on networked data processing systems which are used to continuously monitor or manage the domain. Information and data are presented on one or more data processing displays located in a network operations center, situation room, military command center, public safety operations center, infrastructure security operations control center, or financial trading center, and may be presented to roaming, mobile or remote personnel as well. The user interface of the data processing displays are used by monitoring and management personnel to view information and possibly view context, trends, and historical graphs, and initiate discovery or response actions.

In fault management of telecommunications networks, information is continuously collected from network elements and is combined with data processing models of the equipment and the topology of the network to identify failures to operations technicians. The information may be pre-processed using event correlation before combining it with data processing models of the network equipment and network topology. Event correlation (EC) may do root-cause analysis by distinguishing independent and dependent events, eliminating redundant events, and may synthesize events that are inferred from existing events. The models in this domain are typically static and include description of the operational characteristics of network equipment and network services. Further as conventionally practiced, existing fault management systems cannot readily relate network fault situations with other situations that depend on the telecommunications network in some way. Types of related situations include network performance degradation situations, violations of service level agreements situations, intrusion situations, traffic congestion situations, business processes situations that are operated using the telecommunications network and industrial or urban infrastructure failures that are interdependent with the telecommunications network operation. These limitations are due to the limitations in the fault management systems with respect to knowledge of situations, representation of situations, sharing knowledge of situations, and reasoning about situations.

In financial trading for fund management, information is collected continuously using data processing networks and systems about securities, interest rates, financial market conditions, analysts' reports, mergers and acquisitions, regulatory changes, company announcements and filings, and external events. This information is combined with information about portfolios, funds, and customers, and presented to fund managers, research analysts and traders. As conventionally practiced there may be data processing models and automated data processing analysis to identify fund trends, trading opportunities and recommendations. There may be one or more trading rooms with data processing displays and user interfaces in which traders, analysts, and fund managers view current information related to fund management and security transactions. As conventionally practiced, existing fund management systems can not automatically relate fund situations with other situations that impact fund management. Such other situations include analyst briefings by corporate executives, regulatory changes in an industry covered by the fund, and acquisitions by companies in the fund. These limitations are due to the limitations in the fund management systems with respect to knowledge of situations, representation of situations, and reasoning about situations.

In battlespace management, for example, in a tactical land and air battlespace, information is collected from a variety of real-time sources including sensors on field equipment, air surveillance, field personnel, satellite, and ground radar. This information is collected using a variety of data processing networks and systems, and is combined with information and models about terrain, weather conditions, operational unit formation and size, vehicles, aircraft, weapon systems, and battle plans. There may be one or more situation rooms or military command centers with data processing displays and user interfaces in which commanders view current information related to the battle space. As conventionally practiced under the paradigm of Network Centric Warfare (NCW) to obtain information superiority, according to a recent US Air Force solicitation [Air Force SBIR FY05. 1], the "amount of data continues to grow exponentially while the information is lost" with limited ability to assist in overall situation awareness and understanding. These limitations are due to the limitations in the battlefield management systems with respect to knowledge of situations, representation of situations, and reasoning about situations.

In autonomic systems, information is continuously collected from sensors and is combined with data processing models and the topology of a domain. An autonomic system is collectively understood as (i) self-organized control in mobile robotic devices and platforms or a collection of mobile robotic devices and platforms engaged in chemically, biologically, and radioactively aggressive environments; (ii) autonomic self-organized and self-healing functions of networked micro-sensing devices, and (iii) autonomic and adaptable self-control in remote transportation and scientific platforms and devices for atmospheric, oceanic, and planetary explorations. Further as conventionally practiced, existing autonomic systems can not readily relate domain situations with other situations. These limitations are due to the limitations of autonomic systems with respect to knowledge of situations, representation of situations, and reasoning about situations.

SUMMARY OF THE INVENTION

The present invention is directed to various aspects of situation-based management (SBM). A domain may be instrumented with sensors, probes, surveillance equipment, monitoring apparatus, management apparatus, and other means by which to monitor and report the characteristics of a domain. Hereafter, the term "sensors" is used to refer to one or more of these means of monitoring a domain. Those familiar with the practice of managing a specific domain will be able to identify other means and apparatus by which to monitor and report the characteristics of the domain.

Some sensors may produce signals characterizing one or more properties of the domain, such as waveforms representing audio, pressure, or temperature. These signals may be further processed using digital signal processing equipment integrated with the sensors or connected to it. Processed or unprocessed signals may be provided to other equipment which performs signal fusion operations such as extracting information from the signals, filtering the signals, converting the signals to digital format, eliminating redundant information, and combining multiple signals including historical signals into visual or audio patterns. One object of signal fusion in situation-based management is identification of one or more targets, identification of target location, speed and directions, and tracking one or more targets. Another object of signal fusion in situation-based management is to distribute specialized signal processing functions for efficient transmission. Another object of signal fusion in situation-based management is to convert and extract low-level signals into high-level data more suitable for processing. Still another object of signal fusion in situation-based management is to provide selective monitoring and control by sensors or by detected sensor data patterns The sensors are directly or indirectly connected to one or more radio frequency (RF), microvawe (MW), satellite, or landline (copper, optical, coax) networks collectively called data networks. The signal fusion equipment, if present, may be directly connected to one or more data networks. These data networks may provide point-to-point or broadcast, uni-directional or bi-directional communication between the sensors, the signal fusion equipment and other data processing equipment. The sensors and signal fusion equipment directly provide events about the domain over one or more data networks to one or more data processing systems or the events may be stored for collection at sensors, signal fusion equipment or other data processing equipment.

Events indicate a time-based fact, observation, a description of a state, action, process, or a description of a change in the state of a system. In practice, events are typically referred to as a declaration, a notification, a message, or a recording. Events are represented in any means suitable to convey information about the domain, including human-readable text, digital images or audio or video, digital measurements of signals, and positions of objects in a global positioning system. Events may have duration indicated by the time of their origination and the time of their termination.

Events from sensors and signal fusion equipment are provided to other data processing equipment. This data processing equipment may perform data fusion operations on the events such as filtering, translating, cleansing, aliasing, aggregating, and converting to a uniform representation. Other data processing equipment may perform data fusion operations on the events such as data pattern recognition and tracking object movements. The data fusion equipment takes the resulting events and provides them over one or more data networks to one or more event correlation engines, hereafter EC.

The object of the event collection and event distribution mechanism in situation-based management is to permit:
a wide variety of types of sensors to be incorporated into a situation-based management system;
to distribute event processing so that large volumes of messages can be efficiently processed;
to insure that events contain sufficiently high-level content suitable for processing by the EC; and
to enable the EC to control the event collection and event distribution mechanism.

Event correlation is the process of inferring a new event or a new quality of an event from one or more existing events. A new event may alternatively be referred to as an inferred event, a fused event, a correlatd event, or a synthetic event. For example, one object of the event correlation engine in situation-based management is to reduce a collection of events to a root-cause or a high-level inferred synthetic event. "Event correlation" will be used interchangeably with "event correlator" where the context is understood.

A quality of an event refers to the modality of the event. For example, if x is an event, event correlation may infer "it is suspect that x," "it is possible that x," "it ought to be that x," "it is expected that x," and the like. Those familiar with the practice of event management will be able to identify other modalities of events.

A collection of events may refer to a zero or multiple events in the form of a table of events, a database of events, a queue of events, a list of events, a set of events, a sequence of events, or multiple sequences of concurrent events. Those familiar with logic, set theory, and concurrent processes will be able to identify other means by which to interpret a collection of events. Hereafter, the phrase "collection of events" is used to refer these and other formations of representing events.

The events produced by the EC are provided to one or more Situation Manager engines (hereafter SM), and may be persisted by the EC. Other objects of the event correlation engine in situation-based management are:
to direct the event collection and event distribution mechanism; and
to permit the situation manager to control or coordinate the EC.

A situation is a collection of one or more events that are related by at least one of temporal, spatial, logical, arithmetic, cause-and-effect, or modal constraints. Equivalently, a situation is a time-dependent state of a system that can be described by a collection of declarations and a set of logical, arithmetic, spatial, temporal, structural, causal, modal, or other domain-specific relations and qualities defined over the collection of declarations.

A situation manager (i) is provided incoming events and matches them with stored typical, essential, significant or instructed situations, hereafter collectively called situation templates, (ii) selects at least one situation template based on such comparison, (iii) plans, schedules and executes actions contained in a situation, and (iv) provides information to human users and external systems. A situation manager may also include (a) creating a new situation template by adaptation of existing situation templates, (b) entering new situation templates into a situation library, (c) relating information to external entities, (e) delegating tasks to external entities, (f) providing control input for external entities, (g) predicting a situation via a situation transition graph (STG), or (h) collecting data and measuring the performance of event correlator and situation manager.

The object of the Situation Manager in situation-based management is to:
  determine the situations with the highest priority or the most relevant situations for a domain at any given time;
  provide a situation with its associated context;
  view emerging trends and potential threats or risks; and
  initiate actions that lead to preferred or safe situations.

I. Situation-Based Management

According to one aspect of the invention, a method and apparatus are provided for situation-based management (SBM) of a domain. In one embodiment, a method of SBM comprises:
  creating new situations according to incoming events;
  ordering the created set of situations by priority;
  determining and maintaining topological, spatial, temporal, causal and other domain-specific relations between created situations;
  updating the created situations according to incoming events;
  modifying the created situations according to incoming events; and
  maintaining the set of created situations by adding new or deleting existing situations according to incoming events.

In another embodiment, a method of multi-level, multi-sensor event to situation mapping is provided comprising:
  conducting event collection, correlation and distribution at the first level, wherein multiple sensors convert domain attributes to events; input events are provided to an EC engine; instructions provide control for signal and data fusion; and
  conducting event correlation at the second level, wherein input events are provided to an EC engine; instructions provide control; and input events are correlated; and
  conducting situation management at the third level, wherein correlated events are provided to the SM engine; instructions provide control; and situations are generated, updated, modified, controlled, and maintained In another embodiment, a multi-level architecture for situation-based management of a domain is provided, the architecture performing the method comprising:
  providing a sensing level for generating events related to objects in the domain to provide situation-based management;
  providing a reactive level for event processing to provide situation-based management; and
  providing a next higher level of a more deliberative decision making for providing situation-based management.

In another embodiment a system for managing a domain is provided comprising:
  sensors generating events related to objects in the domain;
  a correlator operating on events related to objects in the domain and able to generate events for situations related to the domain; and
  a situation manager able to recognize and update situations to enable management of the domain.

In another embodiment, each situation in the Situation Manager is instantiated from a predefined catalog of situation templates, by (i) being provided incoming events, (ii) comparing incoming events with a collection of situation templates, and (iii) selecting at least one situation template based on such comparison. The Situation Manager may also include (a) creating new situation templates by adaptation of existing situation templates, (b) entering situation templates into a situation library, (c) deleting situation templates from the situation library, (d) executing or providing actions contained in a situation, (e) relating information to external entities, (f) delegating tasks to external entities, or (g) providing control input for external entities.

In another embodiment the Situation Manager, the situation templates are cases, and the method used by the Situation Manager is case-based reasoning (CBR). The CBR paradigm provides support for continuous refinements of situation assessment, an evaluation of the need for additional information, learning of new knowledge structures and higher-level concepts, establishing multiple prioritized situational hypotheses, and human-guided learning.

In another embodiment the Situation Manager may communicate with one or more Situation Managers for other domains, by sharing situation knowledge, mapping situation knowledge from one domain to another, exchanging situations, exchanging control information and actions, prioritizing situation management between two or more domains, or generating events associated with the relationship among the two or more domains.

II. Coordination of a Situation Manager and Event Correlation in Situation-Based Management In another aspect of the invention, a method and apparatus are provided for coordination of a situation manager and event correlator in situation-based management. In one embodiment, a method for exchanging information is provided, comprising:
  a protocol for providing events from the EC to the SM;
  a protocol for providing events from the SM to the EC;
  a scheduling step in the SM for selecting one or more incoming events from a collection of events;
  a scheduling step in the SM for providing one or more events to a collection of events;
  a scheduling step in the EC for selecting one or more incoming events from a collection of events;
  a scheduling step in the SM for providing one or more events to a collection of events; and
  a scheduling step in the EC for correlating a collection of events and producing a synthetic event.

It is to be understood that phrases of the form "Resource A provides information I to resource B" may be rendered in a number of ways and may be accomplished by a number of means, including:
  A sends I to B;
  A pushes I to B;
  A sends a trap representing I to B;
  B receives I from A;
  B polls A for I;
  B pulls I from A;
  An intermediate broker coordinates the exchange of I between A and B; and
  A publish/subscribe mechanism through which A and B exchange I.

These and other means of "Resource A provides information I to resource B" will be understood and identified to those versed in communications technology.

Further, it is to be understood that in the phrase "Resource A provides information I to resource B via a communications channel" the communications channel may be an inter-process message from the SM to the EC in which the SM and EC processes are running on the same machine, a same-process message in which the SM and EC belong to the same process running on the same machine, an intermediate database into which data are deposited by the SM and retrieved by the EC, an intermediate memory structure into which data are deposited by the SM and retrieved by the EC, or an inter-process message from the SM to the EC in which the SM and EC are running on separate machines and communication is performed via a network that connects two said machines. In addition, a bidirectional communication channel may be the same medium or different media, and if in the same media may operate in simplex, half-duplex, or full duplex mode. In addition, a communications channel may be performed or aided by human intervention, where a human operator takes output from the SM and provides the output as input to the EC. These and other forms of communication will be familiar to those versed in the practice of software and communications technology.

In another embodiment, the SM includes a method and apparatus for controlling the coordination of incoming events and processing of situations, wherein:
- an event selection step in which one or more input events are selected for processing;
- a situation selection step in which one or more situations are selected for processing based on the event selection;
- a situation processing step in which one or more situations are updated or created; and
- the event selection step, the situation selection step, and the situation processing step are sequential and mutually temporally non-overlapping.

In another embodiment, the SM includes a method and apparatus for controlling the coordination of incoming events and processing of situations, wherein:
- the event selection step, the situation selection step, and the situation processing step are temporally overlapping;
- at most one event selection step is active at any time;
- at most one situation selection step is active at any time; and
- at most one situation processing step is active at any time.

In another embodiment, the SM includes a method and apparatus for controlling the coordination of incoming events and processing of situations, wherein:
- the event selection step, the situation selection step, and the situation processing step are overlapping and concurrent;
- zero or more event selection steps is active at any time;
- zero or more situation selection steps is active at any time; and
- zero or more situation processing steps is active at any time.

III. Context-Sensitive Event Correlation with External Control in Situation-Based Management According to another aspect of the invention, a method and apparatus are provided for event correlation in situation-based management to be controlled or directed by the situation manger. In one embodiment, a situation manager has one or more created situations which are incomplete or conflicting, with a method for focusing situation-based management on the completion of these situations comprising:
- The situation manager maintains the sets of created, incomplete and conflicting situations;
- the situation manager selects an incomplete situation, or two or more situations that are in conflict;
- the situation manager determines one or more attributes of the incomplete or conflicting situations which relate to the incomplete or conflicting portions of the situations, respectively;
- the situation manager creates and maintains the list of required attributes which relate to the incomplete of conflicting portions of the situations;
- the situation manager provides the list of required attributes to the EC;
- the EC uses one or more lists of required attributes provided by the SM to adapt the correlation, including incoming event selection, event collection formation, and invocation of correlation rules.

In another embodiment, the situation manager may retract or modify a previously provided list of domain attributes.

In another embodiment, the situation manager provides an event to the EC regarding one or more incomplete or conflicting situations.

In another embodiment, the situation manager may provide additional instructions to the EC with the list of domain attributes, which may be used by the EC during incoming event selection, event collection formation, and invocation of correlation rules.

In another embodiment, the EC uses one or more lists of domain attributes provided by the SM to provide instructions to the event collection and event distribution mechanisms, the method comprising:
- the EC selects categories of sensors related to the domain attributes provided by the SM, such categories including sensor type or sensor position;
- the EC provides information to the event collection and distribution mechanism about the sensor categories of interest;
- the event collection and distribution mechanism distributes instructions to components of sensors, signal fusion, and data fusion, including instructions about sensor categories and sensor event paths.

The event correlation engine may use various reasoning methods, such as:
- rule-based reasoning;
- model-based reasoning;
- state-transition graph based reasoning;
- database query based reasoning;
- neural network based reasoning;
- statistical reasoning;
- binary coding based reasoning; and
- case-based reasoning.

IV. Creating and Using Situation Transition Graphs in Situation-Based Management According to another aspect of the invention, a method and apparatus are provided for the situation manager in situation-based management to construct the actual and predicted evolution of each situation using a Situation Transition Graph, hereafter STG. A STG contains one or more nodes with directed arcs connecting the nodes. In the STG each node is a situation taken from the historic sequence of the situation (those situations starting from when the situation is first created up to the current situation including all intervening versions of the situation as updated by the SM) or from the predicted set of the situation (those situations potentially proceeding from the current situation). In the STG each arc represents a transition from one situation to another. Any path through the STB using the arcs is an evolution of the situation starting at the beginning of the path to the end point. The SM may construct multiple STGs for a given situation. For example, the SM may retrieve a collection of STGs and then select one with the highest priority. SM may manage multiple STGs in parallel.

In one embodiment, the SM is provided pre-defined STG templates that are stored in an STG template library, and at least one template is instantiation for modeling a concrete situation transition flow.

In another embodiment, the SM constructs a STG for situation S, the method comprising:
  selection of one or more nodes from the history set of S;
  selection of one or more nodes from the predicted set of S;
  insertion of a directed arc between any two nodes where the source of the arc is the antecedent node and the destination of the arc is the descendant node according to the node ordering defined by the history set and prediction set.

In another embodiment, the SM constructs a STG for situation S, the method comprising:
  if S is a new situation, then the STG is set to S;
  if S is an existing incomplete situation, an STG for situation S is found which contains the current version of S, where S is a situation being updated by the SM;
  a new version of S is constructed by the SM;
  the new version of S is added to the STG by inserting the new version into the STG and adding an arc from the most recent version of S to the new version.

In another embodiment, the SM performs operations on STGs in order to assess the current situation associated with the STG, the method comprising:
  the SM combines two STGs for the same situation;
  the SM removes nodes or arcs from the STG;
  the SM partitions a STG in to two STGs; and
  the SM compares two STGs for equivalence.

The SM may use one or more methods to extend the STG with predicted situations, including:
  Event Driven Situation Transition;
  Assumption Driven Situation Transition;
  Statistical Correlation Driven Situation Transition;
  Analogical Reasoning Driven Situation Transition; and
  Action Driven Situation Transition.

These and other features of the present invention will be more particularly described with respect to the following figures and detailed description.

DETAILED DESCRIPTION

I. Situation-Based Management

In one embodiment, situation-based management (SBM) refers to a process of:
  identifying a domain;
  identifying the classes of typical situations and their properties that are needed to manage the domain; the classes of typical situations include start situations, transit situations, goal situations, preferred situations, safe situations, threat situations, fault situations, terminal situations;
  identifying the criteria for evaluating situations and prioritizing situations;
  instrumenting the domain with sensors, measurement agents, and event collection apparatus which provide events to an event correlation engine;
  producing situation reports based on the situations, situation transitions, and events from the domain; and
  (optionally) taking action in the domain based on the evaluation of the situations.

A domain is any recognizable area of human activity which can be described as a set of domain entities, set of constraints defined for domain entities, set of relations between domain entities, set of actions over domain entities, set of events happening with domain entities, and set of situations. Important properties of a domain for situation-based management include:
  the domain's situations and their properties may be instrumented and observed or may be not directly instrumented and inferred from other observable situations
  the domain's situations and their properties vary over time;
  the situations can be evaluated using one or more criteria for preference.

The goal of SBM is to recognize, evaluate, and manage the current domain so that (a) a historic sequence of situation transitions can be constructed that lead to the current situation (diagnostic situation management); (b) the current situation can be defined in the context of associated domain entities and their relations (explanatory situation management); (c) the current situation can be transformed into preferred, goal, or safe situations—(control situation management); and (d)

potential future situations will determined as transitions from the current situation (predictive situation management).

Figure 1:
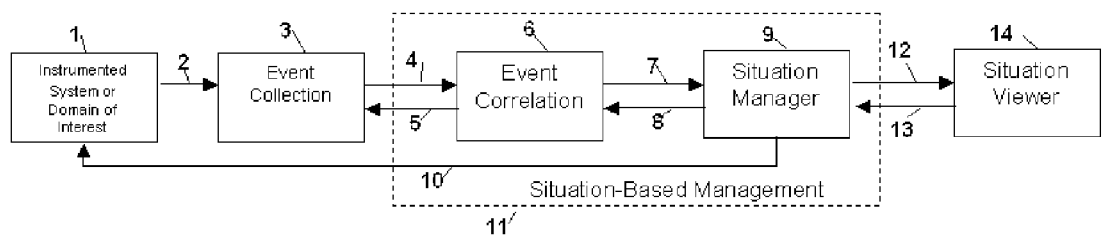
FIG. 1 is a method of managing a domain using situation-based management consisting of event correlation and situation manager.

An SBM method 11, shown in FIG. 1, is one way to accomplish this. In FIG. 1, a domain 1 is instrumented with sensors and agents which measure attributes of the domain. Event collection 3 provides events provided from the domain's instrumentation for correlation by the event correlation 6. Event correlation 6 in turn (a) extracts the essential properties of the events collected by event collection 3; (b) tests the existence of essential constraints attached to the extracted properties of the events; (c) tests the existence of essential relations between the events; (d) tests the existence of essential constraints attached to the domain entities associated with the events; (e) tests the existence of essential relations between the domain entities associated with the events; (f) evaluates the correlation predicates defined over the tests (b)-(e); and (g) generates of an event corresponding to the correlation predicate. The situation manager 9 creates and updates situations using the essential events, synthetic events and other knowledge of the domain. The situation manager 9 evaluates the situations using some evaluation criteria. The situation viewer 14 uses the situations constructed by the situation manager 9, and the situation evaluation criteria. The situation manager may take action 10 on the domain to positively influence the domain's situations or mitigate the impact of the domain's situations. Information provided by Event Correlation 6 via communications channel 5 provides the means for reactive SBM, wherein there is relatively limited time and knowledge available for reacting to information provided by Event Collection 3 via communications channel 4. Information provided by Situation Manager 9 via communications channel 10 provides the means for deliberative SBM wherein there is relatively unlimited time and knowledge required for reacting to information provided by Correlation 6 via communications channel 7.

Figure 2:
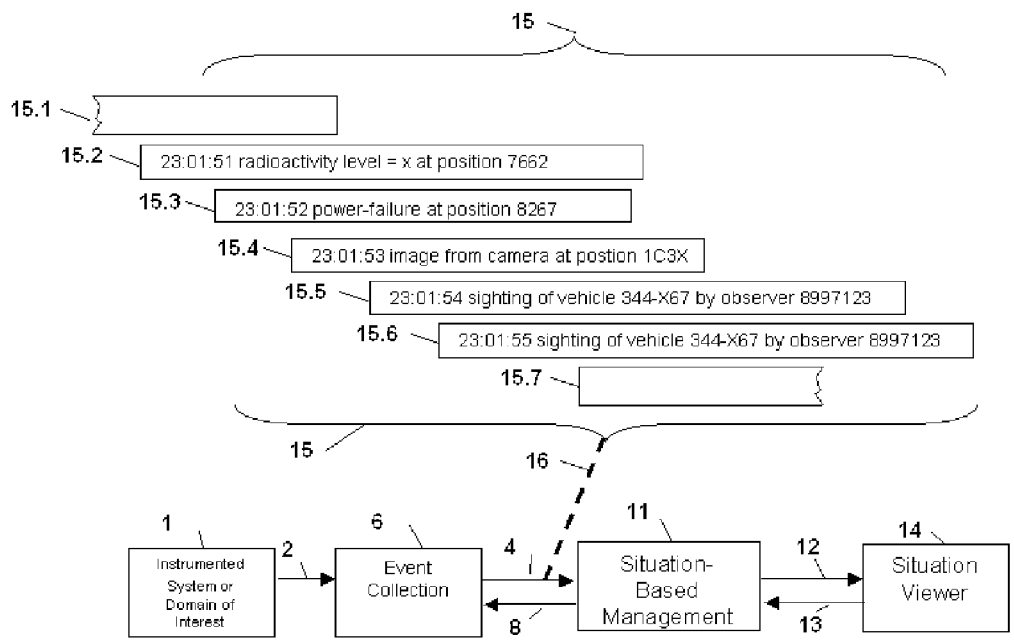
FIG. 2 shows method of managing a domain in which event collection provides events to situation-based management.

FIG. 2 shows example collection of events 15, including events 15.1-15.7 provided by the event collection 3 for use by situation-based management 11 via communications channel 16. The events 15.1-15.7 may include an indication of the time at which the event occurred. The events 15.1-15.7 contain observations from the domain. These observations may be measurements such as event 15.2. These observations may be sensory oriented such as event 15.5. Events may contain modality such as "it is suspect that sensor 123 exceeded threshold".

Figure 3:
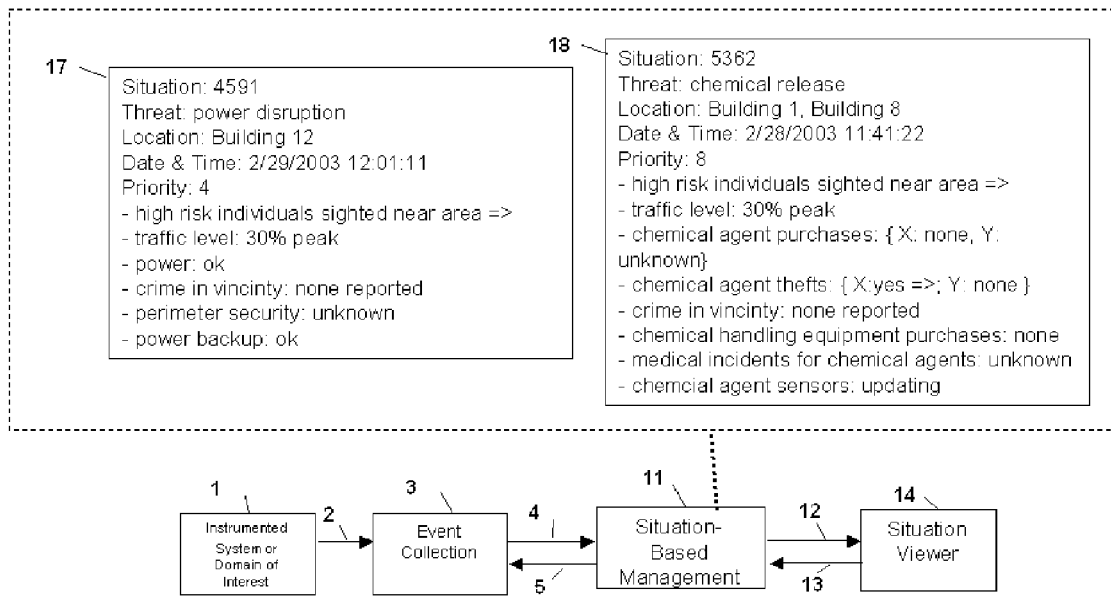
FIG. 3 shows a method of managing a domain in which situation-based management operates on one or more situations.

FIG. 3 shows example situations 17 and 18 created by situation-based management 11. The situations have a summary description or type such as "power disruption" or "chemical release". Situations contain a set of properties which may be unique to the situation or common to different types of situations. The properties may contain actual values, values with likelihood estimates, incomplete values, default values, calculated values, inherited values, inferred values, or the values maybe unknown. The situation may contain evaluation criteria, such as "priority". The situation may include relationships to other situations. The situations may have embedded actions. The situations may have component situations. The situations may have links to other situations. Situations may have access authorization and authentication information. Situations may have activation and expiration dates. Situations may have comments and explanatory texts. The situation may be represented in several formats and may be structured or un-structured FIG. 4. shows that the situation viewer 14 may be a human observer 14.1, an information system 14.2, or a user interface 14.3. A human observer 14.1 may be provided situations, situation reports, extracts of situations, abstracts or summaries of situations, or descriptions of situations through communications channel 12 such as a user interface, an instant message, an email, and a voice, image, or video input system. An information system 14.2 may interface to situation-based management 11 through various means for distributed information systems to exchange information such as messages, remote procedure calls, and shared databases. An information system 14.2 may be provided a situation, situation report, an extract of a situation, an abstract or summary of a situation or a description of a situation from situation-based management 11 by methods such as polling, subscription, retrieval, or function call. The situation, situation report, extract of a situation, abstract or summary of a situation, or description of a situation may be converted to a different format prior to or during the step of providing it to the information system 14.2.

Figure 4:
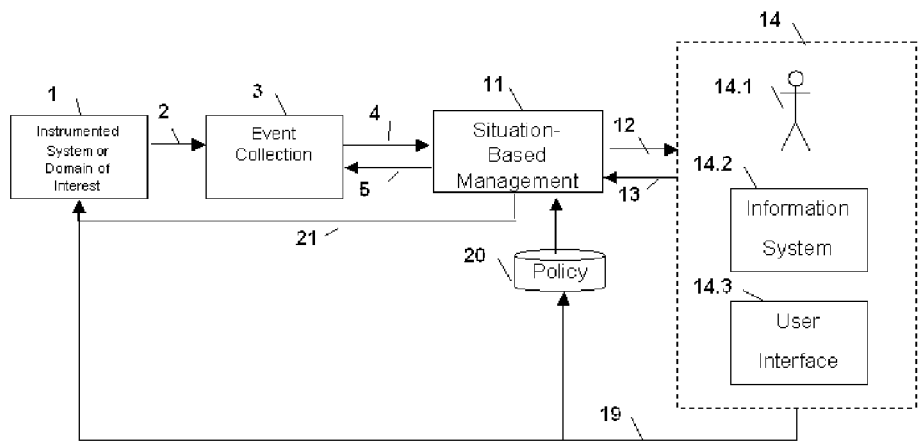
FIG. 4 shows a method of managing a domain in which situation-based management in which a situation viewer has several embodiments.

In FIG. 4, the user interface 14.3 provides at least one modality by which situations, situation reports, extracts of situations, descriptions of situations, and events are presented. User interface modalities include visual, textual, tactile, and auditory. There may be various means to control the presentation such as a keyboard, a pointing device, or voice input.

In FIG. 4, the situation viewer 14 may also operate on situation-based management 11 via communications channel 13. These operations include changing properties of situations, creating new situations, modifying the knowledge base of situation-based management, and modifying the ontology of the situation manager. The situation viewer 14 may access, create, and change policies stored in a policy repository 20 that affect the behavior of the situation manager, including the situation evaluation criteria. The situation viewer 24 may take action on the domain of interest 1 via communications channel 19.

Figure 5:
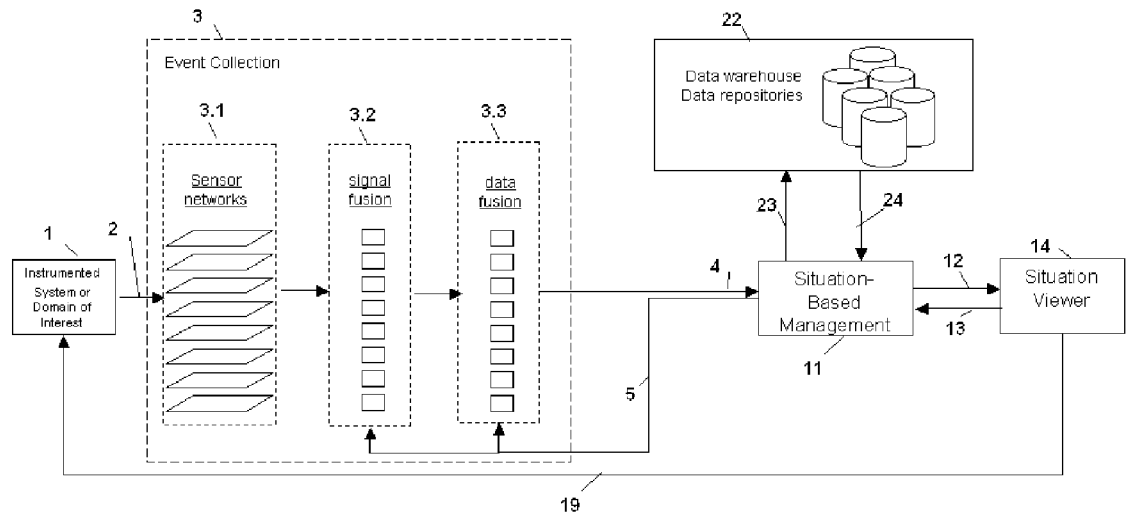
FIG. 5 shows a method of multi-level multi-domain event to situation mapping.

In another embodiment, SBM maps multi-level multi-sensor events to situations. In FIG. 5, the domain 1 is instrumented with sensors and agents which communicate through sensor networks 3.1 to provide sensor information and agent information to fusion elements 3.2 and 3.3. The data provided by sensors may be unprocessed or raw, and it may be in digital or analog format. The sensor data may be provided asynchronously or synchronously. It may be provided through single channel or multiple channels. It may be unicast, multicast or broadcast. The sensors may be sensing single parameters or multiple parameters. The sensors may be sensing one-dimension or multi-dimensional. The sensors may be sensing continuously or discretely.

In FIG. 5, fusion element 3.2 performs signal fusion. Signal fusion operates on the sensor data to convert it to a digital format, to filter the sensor data, to enhance the sensor data at the signal level, to combine the signal data with related signal data, or to perform other signal processing operations on the data. In FIG. 5, fusion element 3.3 performs data fusion. Data fusion operates on digital sensor data which may already be processed by signal fusion 3.2. Data fusion operates on the sensor data to clean the data, alias the data, convert the data to a uniform format, to aggregate the data, to persist the data, and other data fusion operations.

In FIG. 5, situation-based management 11 may be provided information from stored data sources 22 such as data repositories, file systems, database management systems, textual retrieval systems, and data warehouses via communications channel 24. Situation-based management 11 may provide information to stored data sources 22 such as data repositories, file systems, database management systems, textual retrieval systems, and data warehouses via communications channel 23.

In FIG. 5, the SBM 11 may direct the operation of signal fusion 3.2 and data fusion 3.3 via communications channel 5. The signal fusion 3.2 and data fusion 3.3 may be embedded in the sensor network or sensors. The signal fusion 3.2 and data fusion 3.3 may be omitted for some sensors and sensor networks. The methods of signal fusion and data fusion are described in many sources, and are known to those familiar with the art.

Figure 6:
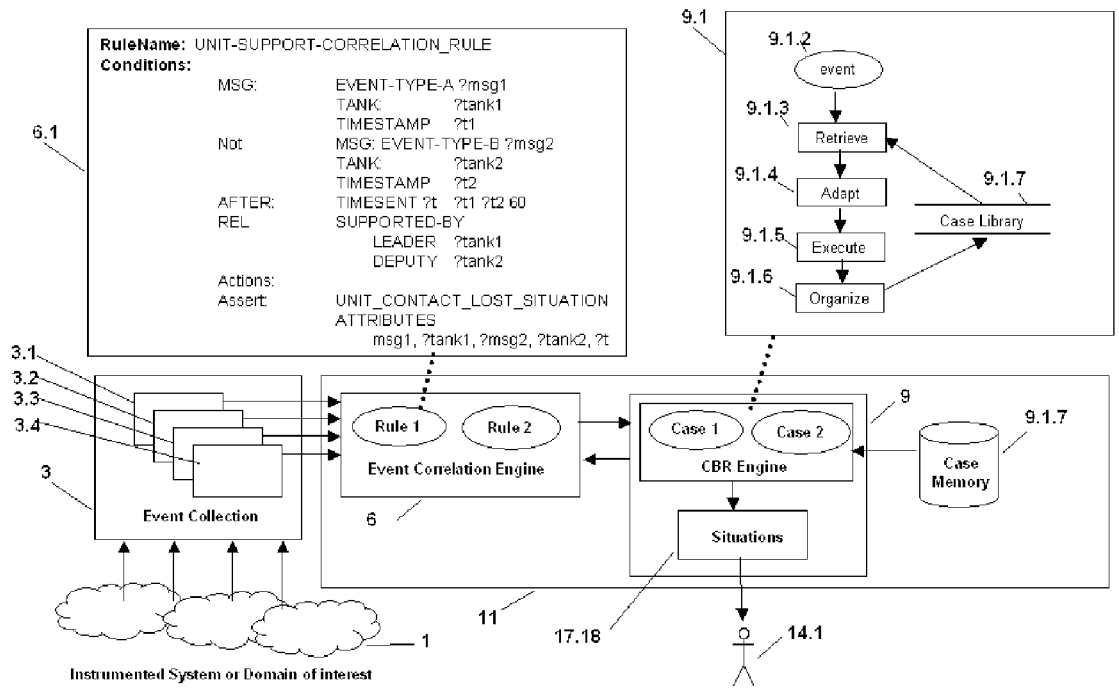
FIG. 6 shows a system for managing a domain in which the EC uses a rule-based engine and the SM uses case-based reasoning.

In FIG. 6, one preferred embodiment for realizing SBM 11 is shown. Instrumented system or domain of interest 1 provide signal and data to signal fusion engines and data fusion engines 3.1-3.4. The SBM system 11 is composed of an event correlation engine 6 and a situation manager 9. The event correlation engine 6 may use a general-purpose rules engine such as CLIPS (C Language Integrated Production System) to execute the correlation rules.

The types of rules used by the event correlation engine 6 include:

| | | |
|---|---|---|
| (1) | $[a, a, \ldots, a] \to [a]$ | Compression |
| (2) | $[a, p(a) \leq H] \to [nil]$ | Filtering |
| (3) | $[a, C] \to [nil]$ | Suppression |
| (4) | $[n \times a] \to [b]$ | Counting |
| (5) | $[n \times a, p(a)] \to [a, p'(a), p' \geq p]$ | Escalation |
| (6) | $[a, \text{subset}(a, b)] \to [b]$ | Generalization |
| (7) | $[a, \text{subset}(b, a)] \to [b]$ | Specialization |
| (8) | $[a \, T \, b] \to [c]$ | Temporality |
| (9) | $[a, b, \ldots, T, \text{and}, \text{or}, \text{not}] \to [c]$ | Logic/Temporality |

Event compression (1) is the task of reducing multiple occurrences of identical events into a single representative of the events. The number of occurrences of the event is not taken into account. The meaning of the compression correlation is almost identical to the single event a, except that additional contextual information is assigned to the event to indicate that this event happened more than once. Event filtering (2) is the most widely used operation to reduce the number of events. If some parameter p(a) of event a, e.g., priority, type, location, time stamp, etc., does not fall into the set of predefined legitimate values H, then event a is simply discarded or provided to a log file. The decision to filter event a out or not is based solely on the specific characteristics of event a. In more sophisticated cases, set H could be dynamic and depend on user-specified criteria or criteria calculated by the system. Event suppression (3) is a context-sensitive process in which event a is temporarily inhibited depending on the dynamic operational context C. The context C is determined by the presence of other event(s), available resources, management priorities, or other external requirements. A subsequent change in the operational context could lead to delivery of the suppressed event. Temporary suppression of multiple events and control of the order of their exhibition is a basis for dynamically focusing the event correlation.

Another type of correlation (4) results from counting and thresholding the number of repeated arrivals of identical events. Event escalation (5) assigns a higher value to some parameter p(a) of event a, usually the severity, depending on the operational context, e.g., the number of occurrences of the event. Event generalization (6) is a correlation in which event a is replaced by its super class b. Event generalization has high utility for situation management. It allows one to deviate from a low-level perspective of events and view situations from a higher level. Event specialization (7) is an opposite procedure to event generalization. It substitutes an event with a more specific subclass of this event. Correlation type (8) uses temporal relation T between events a and b to correlate depending on the order and time of their arrival. Event clustering (9) allows the creation of complex correlation patterns using Boolean operators over conditional (predicate) terms. The terms in the pattern could be primary events or the higher-level events generated by the correlation process.

In FIG. 6, the event correlation rule "UNIT-SUPPORT-CORRELATION-RULE" 6.1 shows the practice of event correlation in SBM. Suppose an event of type A was provided at time t1 from a some tank labeled as ?tank1, but during the following 1-minute (60 second) interval an expected event of type B was not provided from some tank ?tank2. It is also noted that tanks ?tank1 and ?tank2 form a unit, where ?tank1 is the leader and tank ?tank2 is the deputy supporting tank ?tank1. The prefix '?' refers to a variable.

The events to be correlated, then, are A and not-B. Note that not-B is treated as an event. The additional constraints are that (i) a temporal constraint that the event not-B comes 60 seconds later than A; this constraint is implemented using the temporal relation AFTER, and (ii) tanks are in a unit, where the second tank supports the first one; this constraint is implemented using a domain specific relation SUPPORTED_BY.

If the conditions of the rule UNIT_SUPPORT_CORRELATION_RULE are true, then the event UNIT_CONTACT_LOST_SITUATION with the attribute values msg1, ?tank1, ?msg2, ?tank2, and ?t are provided to the situation manager 9.

The temporal relation AFTER is defined as shown below, along with definitions of other temporal relations. Those versed in temporal logic and temporal reasoning will readily understand these and similar frameworks for dealing with time-based events.

Let e1 and e2 be two events where e1=(msg1, [t1, t1']) and e2=(msg2, [t2, t2']).

Event e2 by an interval of h starts after event e1:

$$e2 \text{ AFTER}(h) \, e1 \leftrightarrow t2 > t1 + h \quad (1)$$

Event e2 by an interval h follows event e1:

$$e2 \text{ FOLLOWS}(h) \, e1 \leftrightarrow t2 \geq t1' + h \quad (2)$$

From Eqs. (1,2) it follows that:

$$\text{If } e2 \text{ FOLLOWS}(h) \, e1 \text{ then } e2 \text{ AFTER}(d+h) \, e1 \quad (3)$$

Event e2 by an interval h ends before event e1 ends:

$$e2 \text{ BEFORE}(h) \, e1 \leftrightarrow t1' \geq t2' + h \quad (4)$$

Event e2 by an interval of h precedes event e1:

$$e2 \text{ FOLLOWS}(h) \, e1 \leftrightarrow e1 \text{ PRECEDES}(h) \, e2 \quad (5)$$

Event e2 happens during event e1:

$$e2 \text{ DURING } e1 \leftrightarrow t2 \geq t1 \text{ and } t1' \geq t2' \quad (6)$$

The following derivation rule holds for DURING, BEFORE, and AFTER:

$$\text{If } e2 \text{ DURING } e1, \text{ then } e2 \text{ AFTER } e1 \text{ and } e2 \\ \text{BEFORE } e1 \text{ (and vice versa)} \quad (7)$$

Event e1 starts at the same time as event e2:

$$e1 \text{ STARTS } e2 \leftrightarrow t1 = t2 \quad (8)$$

Obviously the following rule holds:

$$\text{If } e2 \text{ AFTER}(h) \, e1 \text{ and } e1 \text{ AFTER}(h) \, e2 \text{ then } e1 \\ \text{STARTS } e2 \text{ (and vice versa)} \quad (9)$$

Event e1 finishes at the same time as event e2:

$$e1 \text{ FINISHES } e2 \leftrightarrow t1' = t2' \quad (10)$$

If e2 BEFORE(h) e1 and e1 BEFORE(h) e2 then $$e1 \text{ FINISHES } e1 \text{ (and vice versa)} \quad (11)$$

Event e1 conincides with event e2:

$$e2 \text{ COINCIDES WITH } e1 \leftrightarrow t1=t2 \text{ and } t1'=t2' \quad (12)$$

As a consequence of the definition of coincident events, the following is true:

If $e2$ COINCIDES WITH $e1$ then $e2$ STARTS $e1$ and
$e2$ FINISHES $e1$ (and vice versa) (13)

If $e2$ DURING $e1$ and $e1$ DURING $e2$ then $e1$ COINCIDES WITH $e1$ (and vice versa) (14)

Event e1 overlaps with event 2:

$$e1 \text{ OVERLAPS } e2 \leftrightarrow t2' \geq t1' > t2 \geq t1 \quad (15)$$

From the definition of OVERLAPS it follows that:

If $e1$ OVERLAPS $e2$ then $e2$ AFTER($h$) $e1$ and $e1$
BEFORE($h$) $e2$. (16)

In FIG. 6, correlated events are provided by the event correlation engine 6 to the situation manager 9 which is constructed using a CBR engine 9.1. When correlated events 9.1.2 are provided to the CBR system 9.1, four steps 9.1.3-9.1.6 are performed by the CBR engine 9.1. First, the set of events is compared to a library of case templates 9.1.7, and a set of maximally similar cases is retrieved in the retrieve step 9.1.3. In the practice of CBR, a number of retrieval algorithms have been proposed. The simplest and weakest algorithm is key-term matching; the most complex but strongest algorithm is analogy-based matching.

The case library can be thought of as a set of former experiences with situations that are potentially similar to the situation at hand. Typically a former situation has to be adapted in some way to render it applicable to the nuances of a current situation. This is the task of an adapt step 9.1.4. In the practice of CBR, a number of adaptation algorithms have been proposed. Null adaptation covers those episodes wherein a past situation is exactly like a current situation; adaptation by substitution covers those episodes in which an object that occurs as a descriptor in the current situation should be substituted throughout for an object that occurs as a descriptor in the retrieved case.

In the execute step 9.1.5, a command or action recommended by the retrieved/adapted case may be executed. The execution may be conducted manually or may be carried out automatically by the operator 14.1, either in supervised or unsupervised mode. The execution of an action or plan may involve cooperation with other individuals.

The results of the execution are recorded in the case and the case is entered back into the case library 9.1.7 by the organize step 9.1.6. In most CBR systems, the case library is structured as a sequential list, much like a stack of paper forms. In the practice of CBR, there have been several proposals for more complex memory structures. One proposal is the concept of a master case. A master case is one in which all the problem-solving experiences with a particular, well-defined situation are subsumed in one case. This is in contrast with the sequential memory in which each problem-solving experience is confined to a unique case.

In addition to using the CBR engine 9.1 to create situations and adapt situation templates for later use, the situation manager 9 manages the situations 17,18 including determining when to remove a situation and when to update a previously created situation based on an event 9.1.2.

In FIG. 6, the situations 17, 18 are viewed by a situation viewer such as a user 14.1.

The practice of software architecture for distributed systems includes using standard middleware services or components with well-defined functionality and standard inter-component communication protocols. This type of distributed software architecture allows the building of open, scalable, and customizable systems. The encapsulation of the idiosyncrasies of components and the addition, replication, and replacement of components provide an effective environment for developing multi-paradigm, fault-tolerant, and high-performance systems. Various software technologies can be used as the infrastructure of distributed systems, including CORBA (Common Object Request Broker Architecture), Jini, Web Services, J2EE (Java 2 Enterprise Edition), JAIN SLEE (Service Logic Execution Environment) and DCOM (Distributed Component Object Model).

Figure 7:
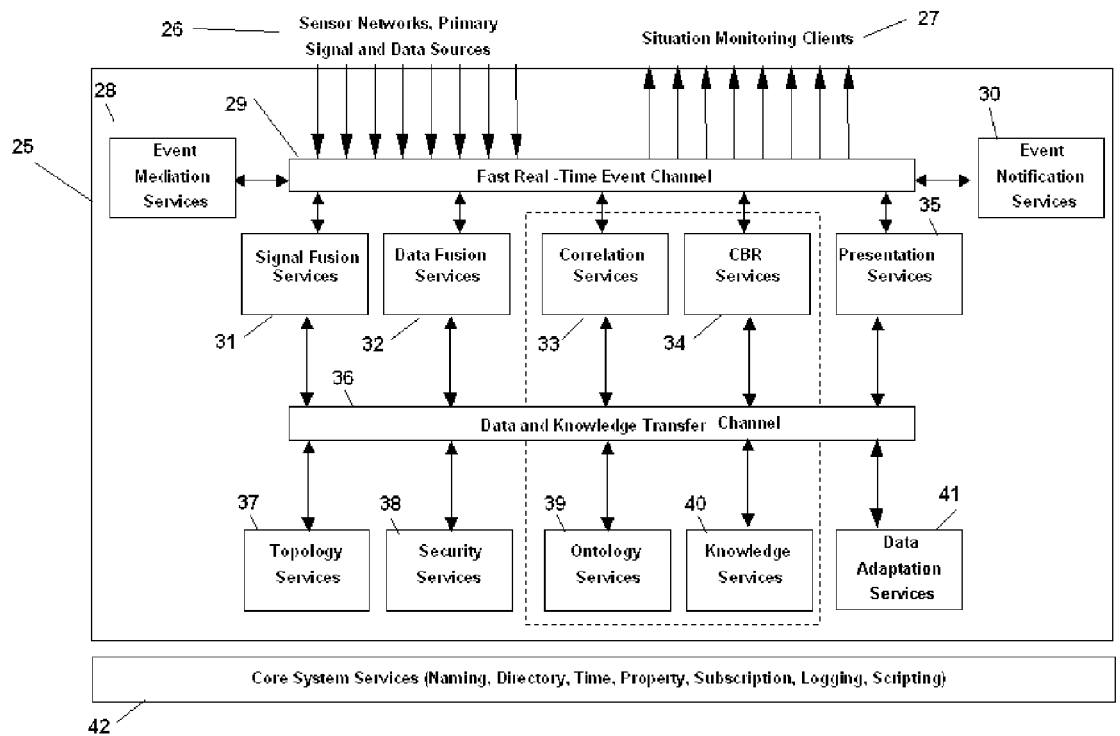
FIG. 7 shows a system for managing a domain using a distributed services architecture.

In FIG. 7, one preferred embodiment for realizing SBM using middleware services is shown 25. The core services are Naming, Directory, Time, Subscription, Logging, and Scripting 42, which are building blocks to build the application services. There are four real-time application services: Signal Fusion 31, Data Fusion 32, Event Correlation 33, and CBR 34. These services are connected to a fast real-time event channel 29. The event channel 29 transports events between services, in which the transport is reliable, fast, and secure. Event Mediation 28 performs the connectivity and protocol conversion functions so that sensor and intelligence data can reach the Signal Fusion 31, Data Fusion 32, and Event Correlation 33 services. Event Notification 30 provides facilities for subscribing to and filtering events.

In FIG. 7, SBM is implemented using Event Correlation Service 33, Case-Based Reasoning Service 34, Ontology Service 39, and Knowledge Service 40. The Ontology Service 39 and Knowledge Service 40 provide domain modeling, knowledge representation, and reasoning facilities used by the Event Correlation Service 33 and the Case-Based Reasoning Service 34.

Other services available for application use include (i) Topology 37 to store, represent, and manipulate information about connectivity, containment, and structural relationships, (ii) Data Adaptation 42 to perform data and knowledge translation functions, (iii) Security 38, (iv) Presentation 35 to support the user interface.

In FIG. 7, sensor data 26 is carried by the real-time event channel 29 to signal fusion 31 and data fusion 32. The fused events are carried by the real-time event channel 29 to the event correlation service 33, which may reference the ontology service 39 and knowledge service 40 via the data and knowledge transfer channel 36 to produce correlated events for the CBR service 34. The CBR service 34 produces situations which are presented to situation monitoring clients 27 using the presentation service 35.

In agent-based software architecture, system function is distributed into modules of autonomous or semi-autonomous software objects called agents. The collective set of communicating agents forms a multi-agent system. A common communication paradigm for multi-agent systems is message passing. In order for agents to cooperate and to enable certain problem solving paradigms, agents may be implemented using a common agent framework. Example agent architectures using the FIPA (Foundation for Intelligent Physical Agents) framework include Agent Development Kit (ADK), Lightweight Extensible Agent Platform (LEAP), and Java Agent Development Framework (JADE).

Figure 8:
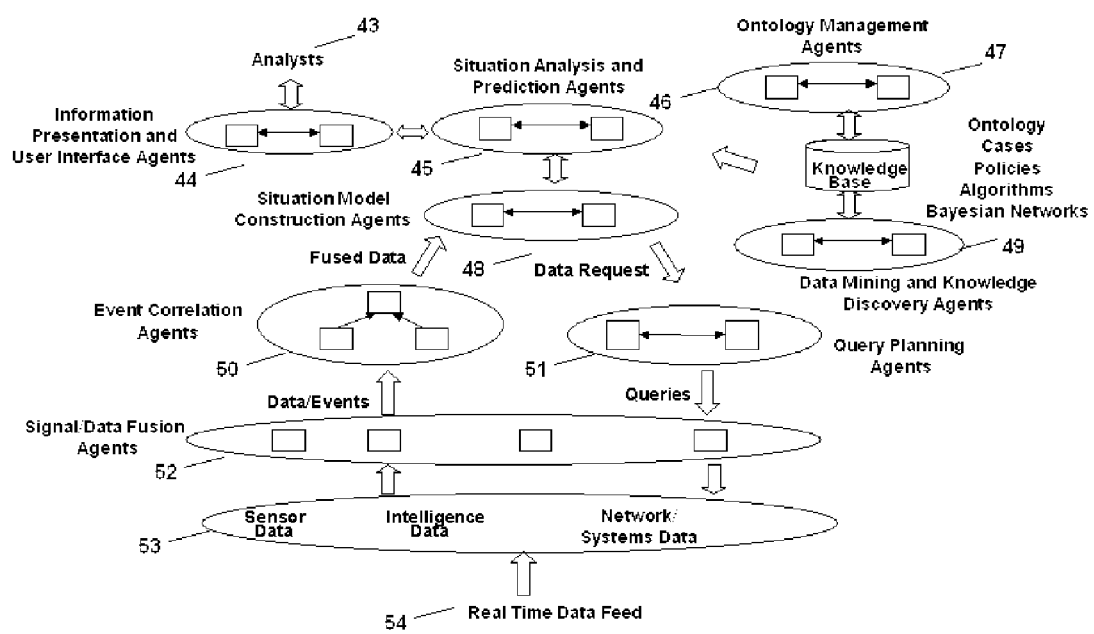
FIG. 8 shows a system for managing a domain using an agent-based architecture.

FIG. 8 shows an SBM system implemented as a multi-agent system. Each oval such as 44 and 45 represents a collection of collaborating agents performing a common functional task. In FIG. 8, arrows between ovals represent information flow between agents, which may be carried by messages. Real-time data 54 from sensors, field observations, and other sources is provided to signal and data fusion agents 52. Signal fusion agents 52 filter, enhance and combine signal data or perform other signal processing operations. Data fusion agents 52 clean, alias, convert, aggregate, and persist real-time data.

Data fusion agents 52 produce events which are provided to event correlation agents 50 which perform the event correlation functions in SBM. Synthesized and correlated events are provided by event correlation agents 50 to situation model construction agents 48 which create situations corresponding to the synthesized and correlated events. These situations are analyzed by situation analysis and prediction agents 45 to identify potential future situations. Agents 50 and 48 correspond to the event correlation and situation management functions in SBM. Presentation of the situations to analysts 43 is coordinated by information presentation and user interface agents 44.

Ontology management agents 47 and knowledge discovery agents 49 maintain knowledge bases which are used by the situation analysis and prediction agents 45. The ontology knowledge base provides semantic information to SBM having to do with the representation of entities in a domain of interest, including synonyms, antonyms, specific-to-general relationships, general-to-specific relations, sibling relationships, and other semantic relationships. The ontology knowledge base may be considered a semantic net that provides information to SBM. Situation modeling and construction agents 45 may also request data from query planning agents 51 which query various distributed data repositories.

Figure 9:
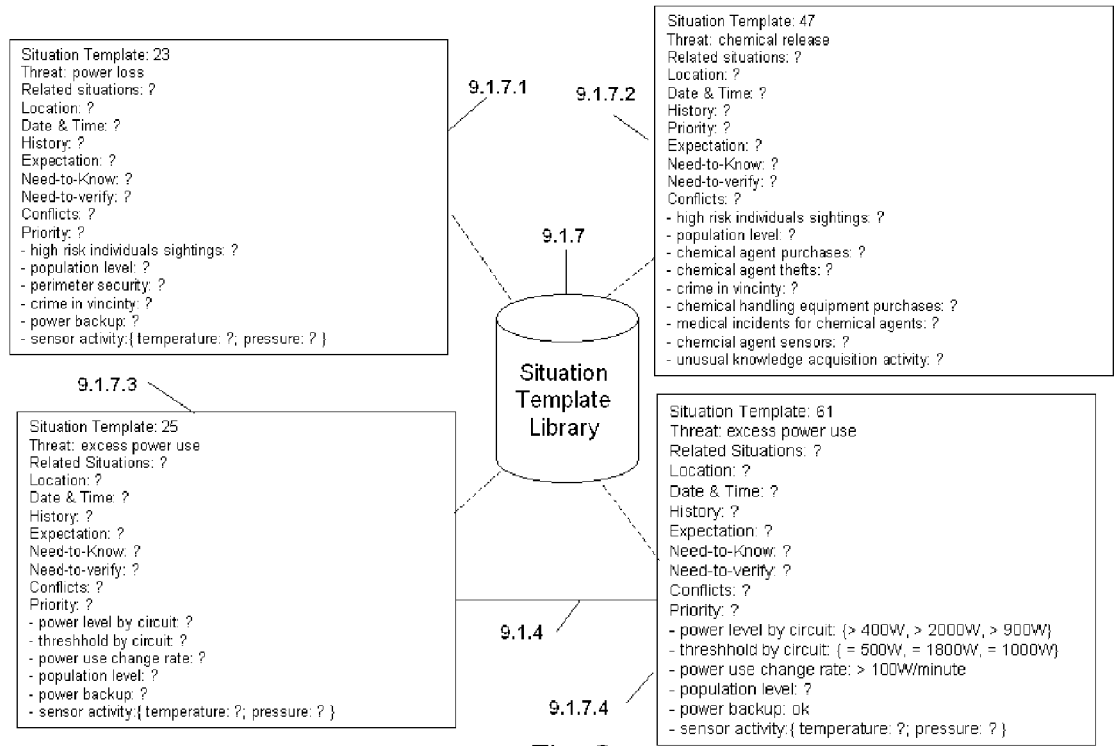
FIG. 9 shows a situation template library and situation templates.

FIG. 9 shows situation templates 9.1.7.1-9.1.7.4 as they might be stored in a situation template library 9.1.7 for use by the situation manager. These templates may have fields or elements such as:
  situation template identifier,
  threat type,
  related situations,
  location of situation,
  date & time when situation occurred,
  history of the situation,
  projections or predications of this situation,
  known information;
  expected information;
  recommended action;
  executable action;
  information needing to be acquired about the situation;
  information needing to be verified about the situation;
  situation attribute conflicts with other situation attributes; and
  priority of this situation.

The values of the fields or elements in situation templates may be unconstrained, represented by a value of "?". The values of the fields in situation templates may be constrained to a specific value or to satisfy an arbitrary relationship such as these constraints from situation template 9.1.7.4:
  power level by circuit: {>400 W, >2000 W, >900 W};
  threshold by circuit: {=500 W, =1800 W, =1000 W}; and
  power use change rate: >100 W/minute.

When the situation manager evaluates the use of a situation template, these constraints must be satisfied by the events that the new situation encompasses.

Situation templates can be predefined by the designers of the SBM system or created from pre-processing a set of situations. These templates can be unconstrained, partially constrained, or completely constrained. The SM can adapt situations that it has recognized into situation templates and store these new situation templates in the situation template library 9.1.7. For example, situation template 9.1.7.4 is adapted from situation template 9.1.7.4 via adaptation step 9.1.4 by the addition of constraints for "power level by circuit", "threshold by circuit", and "power use change".

When the situation uses case-based reasoning, the situation templates are cases and the situation template library is a case library.

Figure 10:
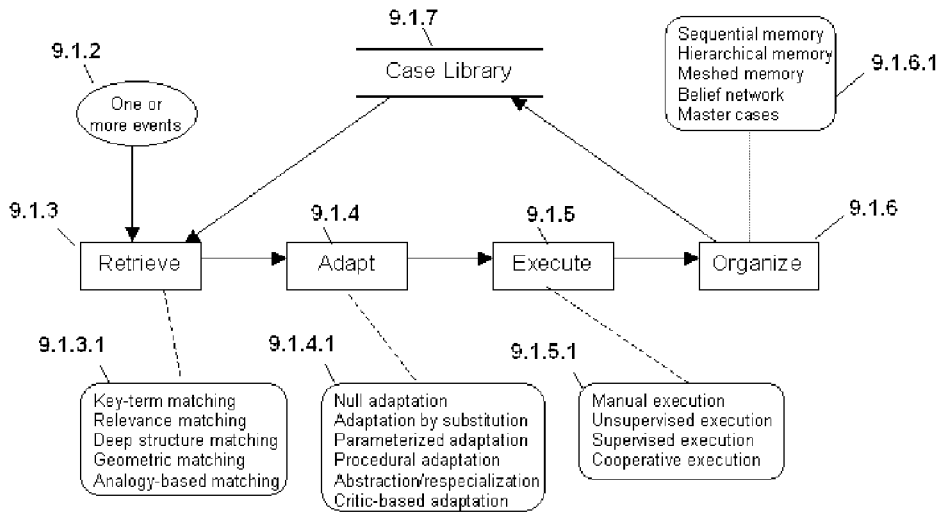
FIG. 10 shows the steps in case-based reasoning.

In FIG. 10 the four steps of CBR are shown: retrieve 9.1.3, adapt 9.1.4, execute 9.1.5, and organize 9.1.6. One or more events 9.1.2 are provided to the retrieve step 9.1.3. The retrieve step 9.1.3 is also provided one or more situation templates from the situation template library 9.1.7 whereupon the retrieve step 9.1.3 matches candidate situation templates with the set of events, using matching techniques 9.1.3.1 such as:
  key-term matching;
  relevance matching;
  deep structure matching;
  geometric matching; or
  analogy-based matching.

The result of the retrieve step 9.1.3 is to select one or more situation templates. If no situation template is selected, then CBR may wait for further events 9.1.2 or may query the user to select a situation template.

When the retrieve step 9.1.3 selects a situation template from the matching process, the adapt step 9.1.4 follows and performs one or more of the modification steps 9.1.4.1 on the situation template such as:
  null adaptation,
  adaptation by substitution,
  parameterized adaptation,
  procedural adaptation,
  abstraction/respecialization, and
  critic-based adaptation.

When the retrieve step 9.1.3.1 selects a situation template that exactly matches the events 9.1.2, then no adaptation is needed, and the situation template is directly instantiated. The result of the adapt step 9.1.4 is to instantiate the adapted situation template with information from the events 9.1.2. The instantiated or populated situation template is a situation.

The situation may contain actions to perform. If there are no actions to perform, the instantiated or populated situation may be available to the situation manager. The execute step 9.1.5 follows the adapt step 9.1.4. If actions are present in the situation, and conditions for performing the actions are satisfied, then the execute step either performs the actions, provides notifications to users or agents or systems to perform the actions, or if an action manager is present in the situation manager, may provide notifications to the action manager to perform the actions. The execute step 9.1.5 may perform actions in different modes 9.1.5.1 including manual execution, unsupervised execution, supervised execution, and cooperative execution. The results of the execute step 9.1.5 are stored in the situation.

After the execute step 9.1.5, the instantiated or populated situation is available to the situation manager. The organize step 9.1.6 enters adapted situation templates into the situation template library 9.1.7 for future use. The situation template library 9.1.7 may be organized in a number of ways 9.1.6.1, including sequential memory, hierarchical memory, meshed memory, belief network, and master cases.

Figure 11:
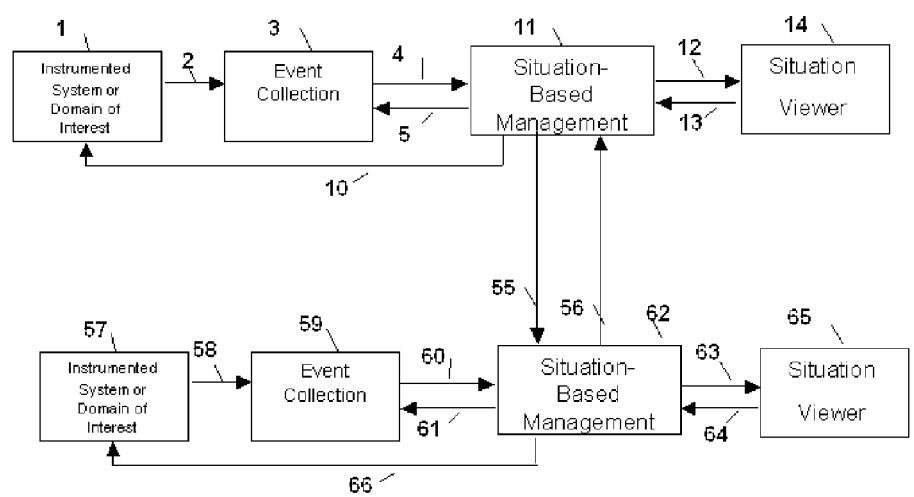
FIG. 11 shows two SBM systems coordinating.

In FIG. 11, SBM 11 for one domain 1 may be coordinated with SBM 62 for another domain 57 along communications channels 55 and 56. The types of coordination including providing situation templates, adapted situation templates, situations, events, actions, and other information from one SBM to another. This type of coordination may be important when two SBM systems manage two related domains.

Figure 12:
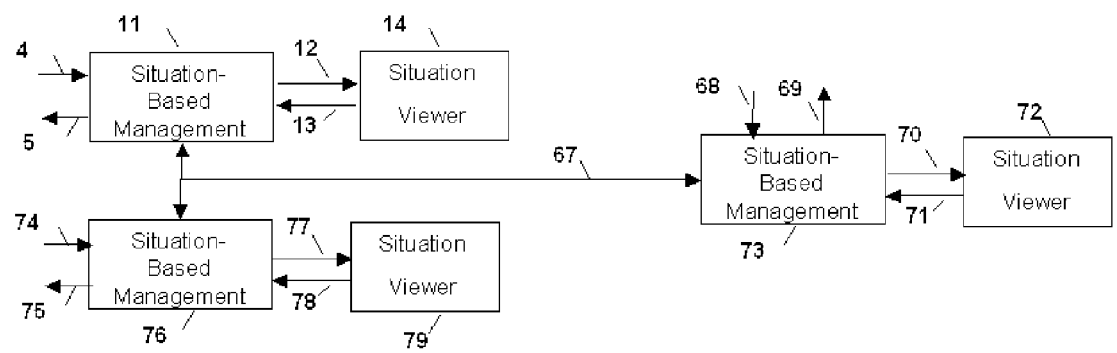
FIG. 12 shows multiple SBM systems coordinating in a two level hierarchy.

In FIG. 12, SBM 11 and SBM 76 may provide situation templates, adapted situation templates, situations, events, actions, and other information to another SBM 73 along communications channel 67. This type of coordination may be important when one SBM 73 is managing a domain that is a superset or hierarchically superior to the domains managed by SBM 11 and SBM 76.

Figure 13:
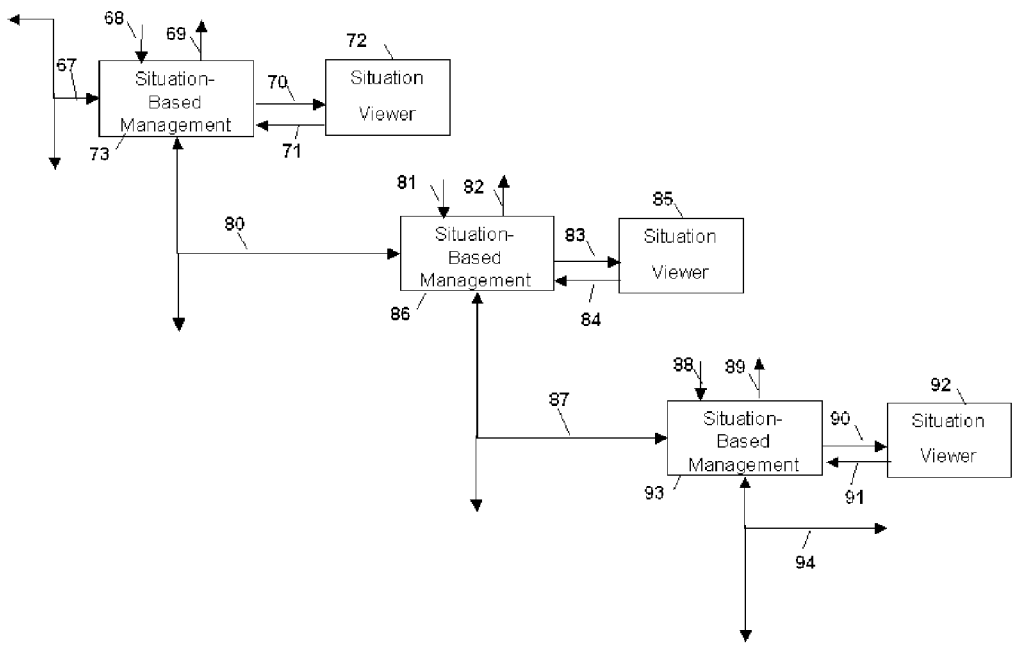
FIG. 13 shows multiple SBM systems coordinating in a multi-level hierarchy.

In FIG. 13, SBM 73 and other SBMs may provide situation templates, adapted situation templates, situations, events, actions, and other information to another SBM 86. Further, SBM 86 and other SBMs may provide situation templates, adapted situation templates, situations, events, actions, and other information to another SBM 93. The situation viewer 85 may view, manage, modify, and execute situations produced by SBM 73 and other SBMs. Likewise situation viewer 92 may view, manage, modify, and execute situations produced by SBM 86 as well as by SBM 73 other SBMs.

This may correspond to the practice of SBM in hierarchical or multi-layered configuration. Such practice might occur if SBM 73 and other SBMs manage different neighborhoods or areas of a city A, if SBM 86 manages city A and other SBMs each manage other cities in a region R, and SBM 93 manages region R and other SBMs manage other regions in a state or province or country.

II. Coordination of a Situation Manager and Event Correlation in Situation-Based Management According to another aspect of the invention, a method and apparatus are provided for coordination of a situation manager and event correlation in situation-based management.

Figure 14:
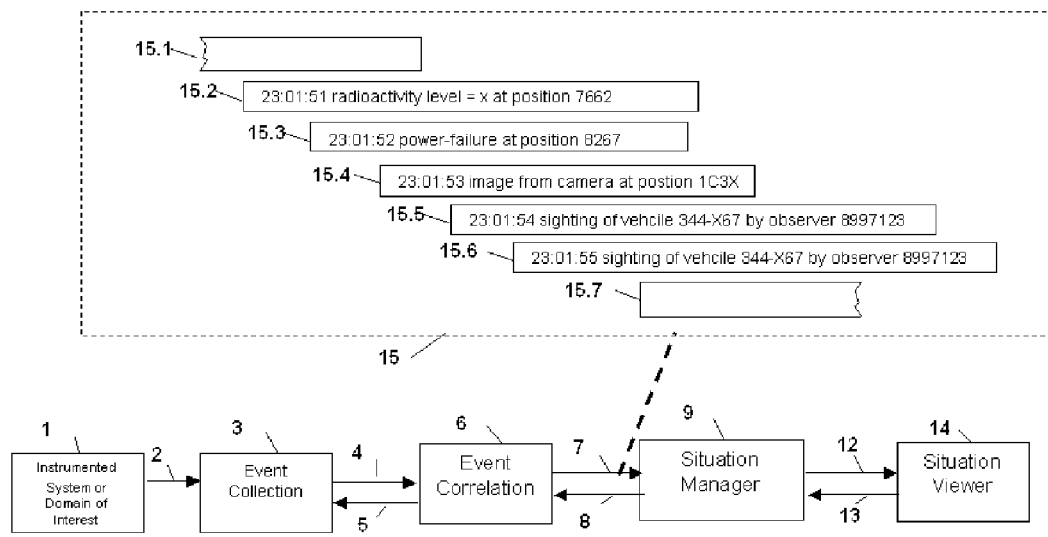
FIG. 14 shows method of managing a domain in which event correlation provides events to the situation manager.

In FIG. 14, EC 6 provides a collection of events 15, including for example events 15.1-15.7, to the SM 9. Each event has a date and time indication and contains the description, properties and other attributes of the event. The EC's 6 schedule of providing events to the SM 9 may be asynchronous or synchronous with the SM's schedule of processing events. In the asynchronous case, the EC 6 may provide events immediately upon synthesizing them or may temporarily buffer such events depending on resource availability or the relative priority of activities the EC is performing. In the synchronous case, the EC 6 and SM 9 operate on the same periodic schedule of providing events from the EC 6 to the SM 9. The number of events provided in a periodic schedule may be zero or more.

Figure 15:
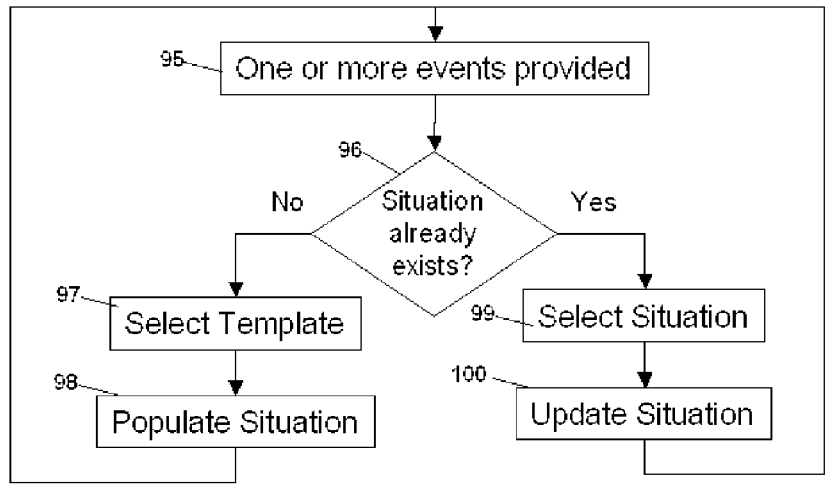
FIG. 15 shows the serial non-overlapping scheduling of situation manager activities.
Figure 15:
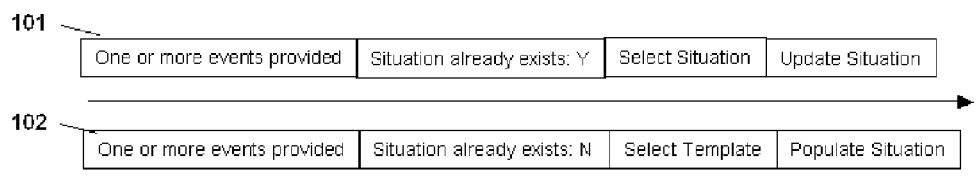

In FIG. 15, the SM first is provided one or more events 95 from the EC. The SM then determines if a situation corresponding to these events already exists (96). For each such situation, the SM selects (99) and updates (100) the situation with information from the event. In updating the situation, the SM may use various reasoning paradigms, collect additional information, refer to situation transition graphs, and provide information to the user. If no situation corresponding to these events already exists, then the SM selects (97) one or more templates from the situation template library and then populates (98) the situation template to create a situation. The SM may also adapt the situation, execute actions, and organize the situation template library.

In addition to the steps shown in FIG. 15, the SM may also update the situation transition graph and develop projected situations.

In FIG. 15, the sequence of steps 101 is shown in time order, corresponding to the steps:
one or more events provided 95,
situation already exists: Y 96,
select situation 99, and
update situation 100.

The steps are sequential and non-overlapping. Similarly, the sequence of steps 102 are shown in time order, and are sequential and non-overlapping.

Figure 16:
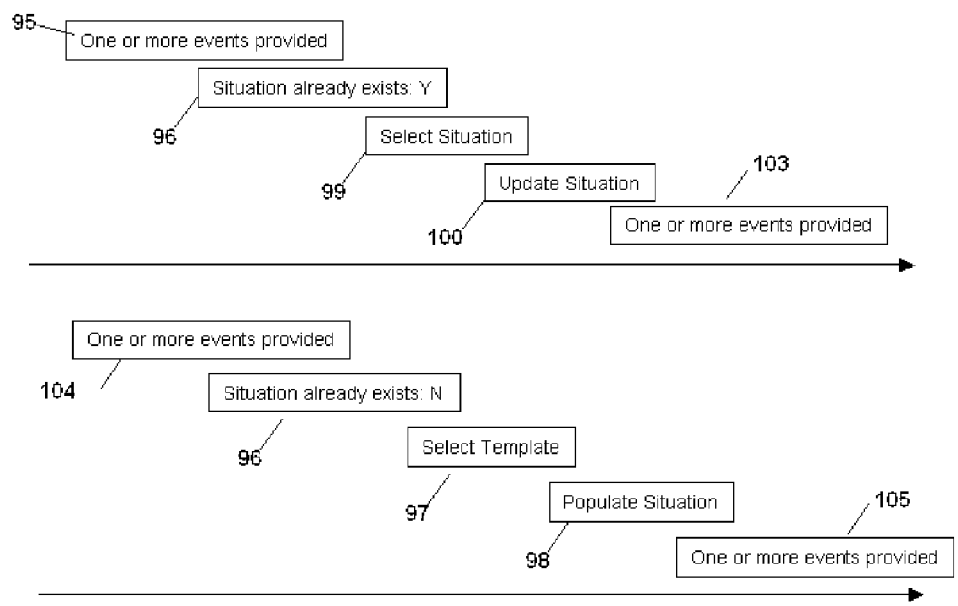
FIG. 16 shows the serial overlapping scheduling of situation manager activities.

In FIG. 16, the sequence of steps 95-96-99-100-103 are shown as sequential and possibly overlapping. Similarly, the sequence of steps 104-96-97-98-105 are shown as sequential and possibly overlapping. The amount of overlap of a step varies by the operation, available resources, and synchronization constraints between successive steps. The benefit of overlap is increased performance due to more steps being performed in a given time segment.

Figure 17:
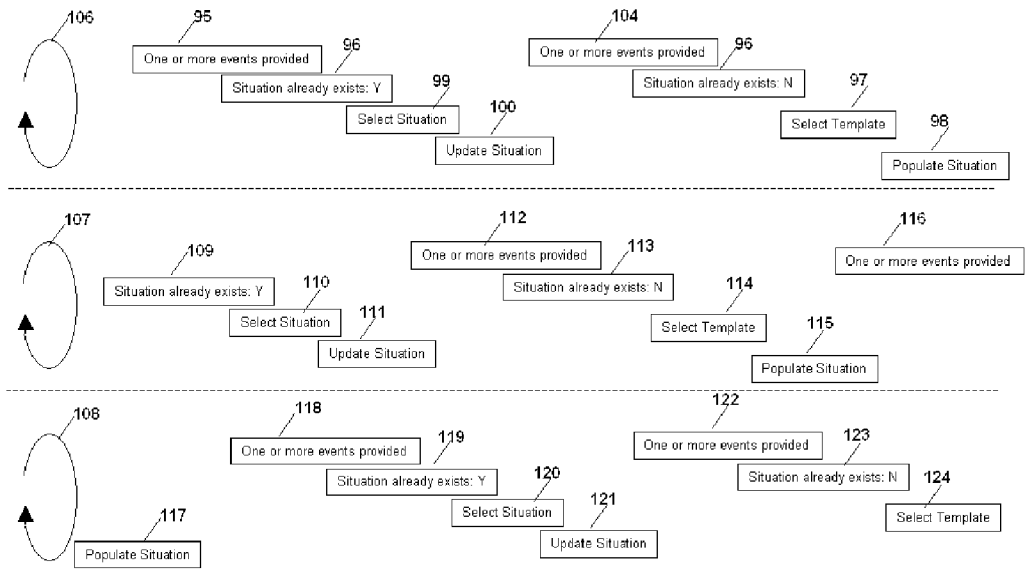
FIG. 17 shows the concurrent overlapping scheduling of situation manager activities.

In FIG. 17, there are three parallel sequences of operations (labeled 106, 107, and 108). Operation 106 is the sequence 95-96-99-100-104-96-97-98. Operation 107 is the sequence 109-110-111-112-113-114-115-116. Operation 108 is the sequence 117-118-119-120-121-122-123-124. These parallel sequences are concurrent activities, which might be realized on a multiprocessor computer or using distributed processing in a data processing network. These parallel sequences might be implemented in separate computer operating system tasks or processes, in a single process with one thread per activity, or using some other computer system concurrency paradigm. Each sequence of operation 106, 107, and 108 has sequential and possibly overlapping steps. FIG. 17 teaches that concurrent sequences of SM operations can be active, where each sequence may have sequential overlapping steps.

III. Context-Sensitive Event Correlation with External Control in Situation-Based Management According to another aspect of the invention, a method and apparatus are provided for the providing context-sensitive information from the situation manager to the event correlator. As an example, consider a current situation that is believed to be in effect. The parameter values of the situation may be partially instantiated so that the confidence level of the situation is less than perfect. The situation may contain parameters which, if provided, may increase the confidence level of the situation. Thus, the SBM may take action to be provided the missing information or provide instructions to external resources, such as the EC, to provide such information.

As a more concrete example, suppose a retrieved situation holds a particular decision for a problem where the decision is based on the value of a variable x in some event message:
Retrieved Situation
Given situation Sand parameter x, then
Perform action A(x)
Perform action B(x)
Make decision d=C(A(x), B(x))
Here, A, B, and C may be functions that take a numeric x as a parameter or they may be inferences from a symbolic x. In practice, a user might find that the decision is inadequate because an additional parameter y appears that renders the decision unworkable. The introduction of a new parameter y, forces us to modify the initial function B(x) and define a new function B'(x,y). Further, parameter x in the current situation might be some new value of x, say x. The user can adapt the situation using parameterized and critic-based adaptation as follows:
Adapted Situation
Given situation S, and parameters x and y
Perform action A(x)
If x=x then Perform z=B(x)
Else if x=x and y then Perform action z=B'(x, y)
Make decision d=C(A(x), z)
The adapted situation that is organized in the situation repository will cover future problem-solving situations in which only x is available and in which both x and y are available. Also, it is expected that further experiences with situation Swill enhance the knowledge required to perform tasks in future situation that are similar to S. In this way, the system's knowledge is improved with experience.

This example demonstrates three features: First, it demonstrates how the system exhibits a degree of learning with use. Second, it demonstrates how alternative situations can be ranked with certainty factors based on the available information. The situation produced when both x and y are available would have higher rank than a situation produced when only x is available, all else being equal. Third, it demonstrates how the system may uncover impediments or opportunities. The situation may be retrieved when only x is available, whereupon the system provides instructions or other information regarding the need for y.

Figure 18:
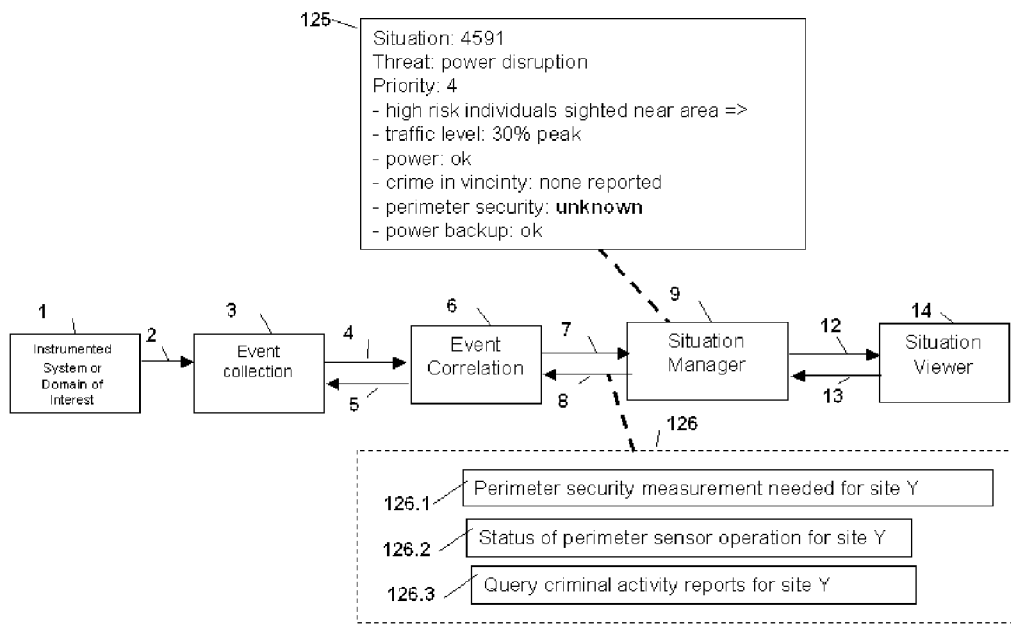
FIG. 18 shows the SM directing the EC.

FIG. 18 shows an apparatus with Event Correlation 6 and Situation Manager 9. FIG. 18 also shows the flow of information between Situation Manager 9 and Event Correlation 6 via communication channels 7 and 8 respectively. The events that are provided from Event Correlation 6 via communications channel 7 are used to invoke situations by Situation Manager 9. Such situations may be considered as hypotheses with some degree of confidence, probability, or certainty. In reverse direction, via communications channel 7, a hypothesized situation may suggest further information which, if it were available, would strengthen the hypothesis. Situation Manager 9 may provide information to Event Correlation 6 whereupon Event Correlation 6 takes some actions. Additionally, Situation Manager 9 may alert the operator of an opportunity to provide information via the Situation Viewer 14 via communications channel 12.

FIG. 18 shows a scenario in which Situation Manager 9 provides information 126, including information 126.1, 126.2, and 126.3 to Event Correlation 6 via communications channel 8. In the case of FIG. 18, information 126.1, 126.2, and 126.3 have to do with the need for additional information based on the context provided by the current situation in affect. For example, in situation 125, "security perimeter" value is "unknown" and "crime in vicinity" value is "none reported." Information 126.1 and 126.2 call for a need of information, whereas information 126.3 calls for a query to an external source for additional information.

Information 126.1, 126.2, and 126.3 may be provided by Situation Manager 9 individually, or they may be provided in a batch. Further, Situation Manager 9 may schedule the providing of information to Event Correlation 6.

Figure 19:
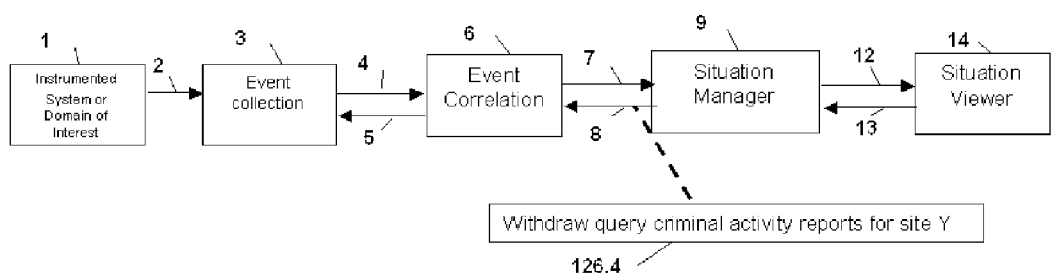
FIG. 19 shows the SM retracting a previous direction to the EC.

FIG. 19 shows another scenario in which Situation Manager 9 provides information to Event Correlation 6 via communications channel 8. In the case of FIG. 19, information 126.4 calls for the withdrawal of a query. In other embodiments, information may call for the withdrawal of a need for information or the withdrawal of an instruction.

Figure 20:
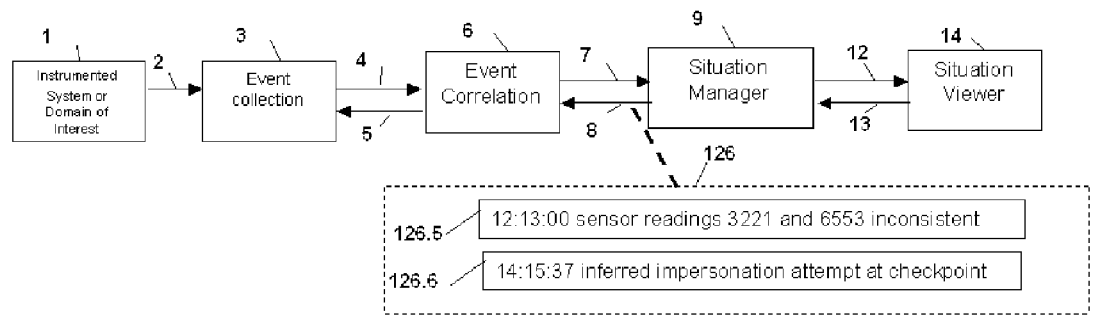
FIG. 20 shows the SM providing events to the EC.

FIG. 20 shows another scenario in which Situation Manager 9 provides information 126, including information 126.5 and 126.6 to Event Correlation 6 via communications channel 8. In the case of FIG. 20, information 126.5 and 126.6 indicate information that has been inferred by Situation Manager 9 and provided for Event Correlation 6.

Figure 21:
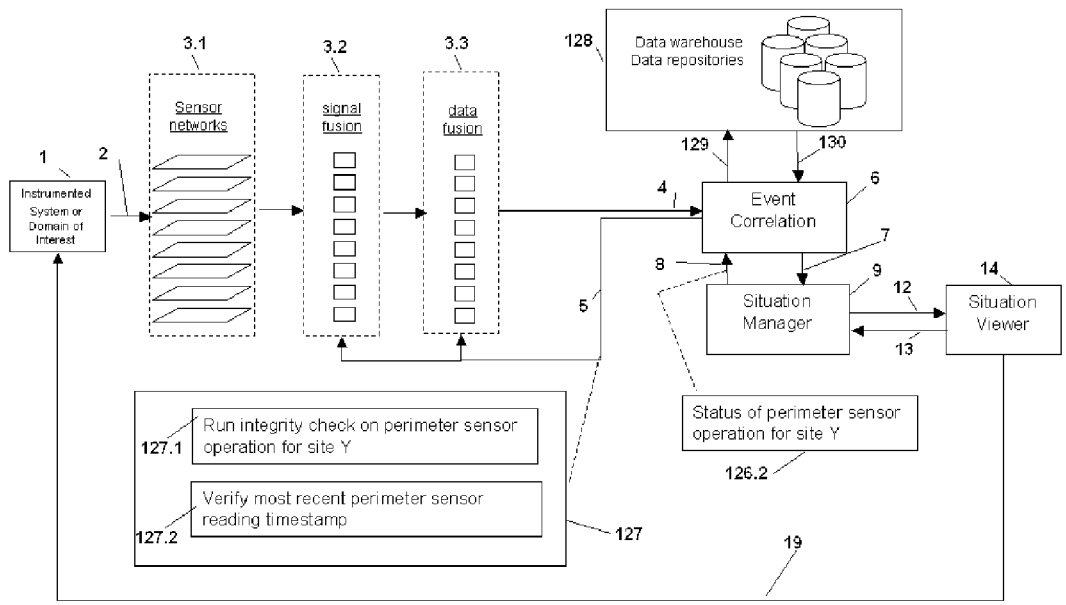
FIG. 21 shows the SM providing instructions to the EC regarding event collection.

FIG. 21 likewise shows Situation Manager 9 providing information 126.2 to Event Correlation 6 via communications channel 8.

FIG. 21 furthers shows Event Correlation 6 providing information to Data Repository 128 via communications channel 129 and being provided information from Data Repository 128 via communications channel 130.

FIG. 21 furthers shows Event Correlation 6 providing information 127, including information 127.1 and 127.2 to external signal fusion process 3.2 and data fusion process 3.3 via communications channel 5 and being provided information from same via communications channel 4.

FIG. 21 further shows Situation Manager 9 providing information to Situation Viewer 12 and Situation Viewer 12 providing information directly to the Instrumented System or Domain of Interest 1 via communications channel 19.

In FIG. 21, Event Correlation 6 performs the function of brokering or managing the context-sensitive information provided by Situation Manager 9. In one embodiment, Event Correlation 6 performs a pass-through function in which context-sensitive information is provided directly to Data Repository 128, signal fusion process 3.2, or data fusion process 3.3. In such embodiment, Event Correlation 6 may act as Event Manager or Event Broker. In a second embodiment, Event Correlation performs a "pre-processor and decision-maker" function in which context-sensitive information provided by Situation Manager 9 is combined with other known information in EC's memory, and as a result information is provided to Data Repository 128, signal fusion process 3.2, and data fusion process 3.3. Such information may not necessarily be the same as the context-sensitive information provided by Situation Manager 9. In yet a third embodiment, Event Correlation 6 may perform a "pre-processor, decision maker, and event correlation" function in which the total collection of events known by Event Correlation 6 are combined to infer a new event or a new quality of an event.

IV. Creating and Using Situation Transition Graphs in Situation-Based Management According to another aspect of the invention, a method and apparatus are provided for creating and utilizing a situation transition graph (STG) in situation-based management.

While considering dynamic and evolving situations over time, we are interested not only in the parameter values of some situation at some particular time, but also in the nature of how situations change. The dynamics of situations are reflected by situation transitions. A situation transition is a relationship between two situations in which one situation is the start of the transition, hereafter start-situation, and the other is the end of the transition, hereafter end-situation. A situation transition represents a sequential, iterational or serial progression from one situation to another situation. A situation may be a start-situation for one or more end-situations. A situation may be an end-situation for one or more start-situations. A situation may be both a start-situation and an end-situation.

Theoretically, it is possible to use the model of Finite State Machines (FSM) or state transition graphs to describe these transitions; however, the simplicity of state specifications and augmentation of transitions with simple input/output variables make these approach ineffective for situation management. Using dynamic situations for describing situations and using event correlation and other techniques for determining situation transitions provide a more powerful tool for defining the dynamics of the situation changes over time. In SBM, situation transitions may involve complex logical and modal conditions defined over multiple events and situations which are not effectively represented in FSM.

Figure 22:
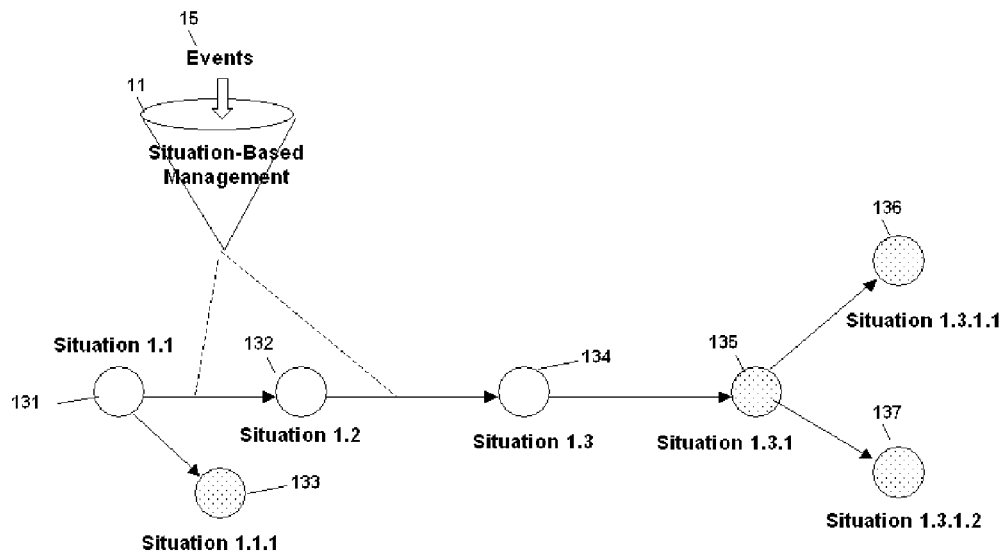
FIG. 22 shows a situation transition graph.

The overall process of modeling the dynamics of situations over time involves a means by which to cause a transition from one situation to another as shown in FIG. 22. In FIG. 22, it is seen that situation 1.1 (131) is a current situation that has been recognized by SBM 11. In addition to SBM recognizing situation 1.1, the SBM provides events that may cause the movement from situation 1.1 (131) to situation 1.2 (132) or situation 1.1.1 (133). Events 15 that are processed by SBM 11 may include sensor events, intelligence events, environmental events, and the like, and the presence of same or inferences therefrom by SBM 11 may cause the movement from one situation to a possible future situation, as shown by the dotted line from SBM 111 to the arc connecting situation 1.1 (131) and situation 1.2 (132). This process can be performed repeatedly, depending upon the events that are processed by SBM 11, as shown by a second dotted line from SBM 11 to the arc connecting situation 1.2 (132) and situation 1.3 (134).

During this modeling process certain situations are identified as the start, target, undesirable, and transitional situations. Other types of situations can be introduced depending on the objectives of the modeling process and the characteristics of the domain under consideration. For example, one of the tasks in dynamic battle-space situation modeling is the identification of enemy threats and actions to avoid catastrophic situations or reach winning situations. In FIG. 22, situations indicated by darkened circles, namely 1.1.1 (133), 1.3.1 (135), 1.3.1.1(136), and 1.3.2.1 (137) could be considered as potential threat situations.

The transitions between situations may be driven by various methods, including:
  Event Driven Situation Transition;
  Assumption Driven Situation Transition;
  Statistical Correlation Driven Situation Transition;
  Analogical Reasoning Driven Situation Transition; and
  Action Driven Situation Transition.

Event Driven Situation Transition determines the next situation based on the presence of certain events issuing from SBM 11, which may result from SBM processing as described earlier.

Assumption Driven Situation Transition is similar to event driven transition; however, in this case the transition is not undertaken due to incomplete, missing, or inexact information. The objective is to hypothesize or assume the occurrence of an event and to project the possible movement from some current situation to a future situation based on the hypothesis. The result of this aspect of the embodiment should be interpreted as a method of providing an early warning of potential threat situations if such-and-such events were to be provided by SBM 11. Action Driven Situation Transition is similar to the Event Driven Situation Transition, where an action is provided by an SBM internal scheduling process, defined by a user, instructed by external system, or inflicted by an adversary.

Statistical Correlation Driven Situation Transition provides transitions from one situation to another situation by first determining transition triggers based on a history of past known situations. For example, statistical correlation methods may determine that to some degree of probability, or to some degree of certainty, or to some degree of confidence, situation 1.2 (132) follows situation 1.1 (131) upon the occurrence of one or more events provided by SBM 11.

Figure 23:
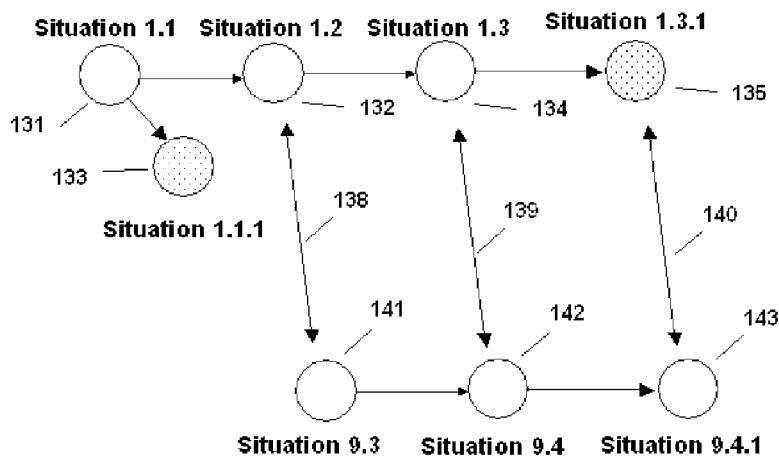
FIG. 23 shows the comparison of two situation transition graphs.

Analogical Reasoning Driven Situation Transition provides the transitions from one situation to another situation by comparing a current situation in one domain to a situation in a second domain. FIG. 23 shows an STG involving situation 1.1 (131), 1.2 (132), 1.3 (134), and 1.3.1 (135) in one domain. FIG. 23 also shows a situation 9.3 (141), situation 9.4 (142) and situation 9.4.1 (143) in a second domain. For purposes of illustration, we may presume that leading numerals 1 and 9 indicate separate, but analogical domains such as a physical domain and a cyber-domain. Situations in each domain are compared for similarity along some number of possible dimensions, including structural, semantic, temporal, and cause-and-effect dimensions. If such comparison determines a similarity beyond some pre-defined threshold, for example between situation 1.2 (132) and situation 9.3 (141), then it may be inferred that a movement from situation 9.3 (141) to situation 9.4 (142) will be similar to the movement of situation 1.1 (131) to situation 1.2 (132). The three arrows 138, 139, and 140 in FIG. 25 illustrate that projected movements from situation 9.3 (141) to situation 9.4 (142) and then to situation 9.4.1 (143) follow the same pattern as the movement from situation 1.2 (132) to situation 1.3 (134) to situation 1.3.1 (135).

Figure 24:
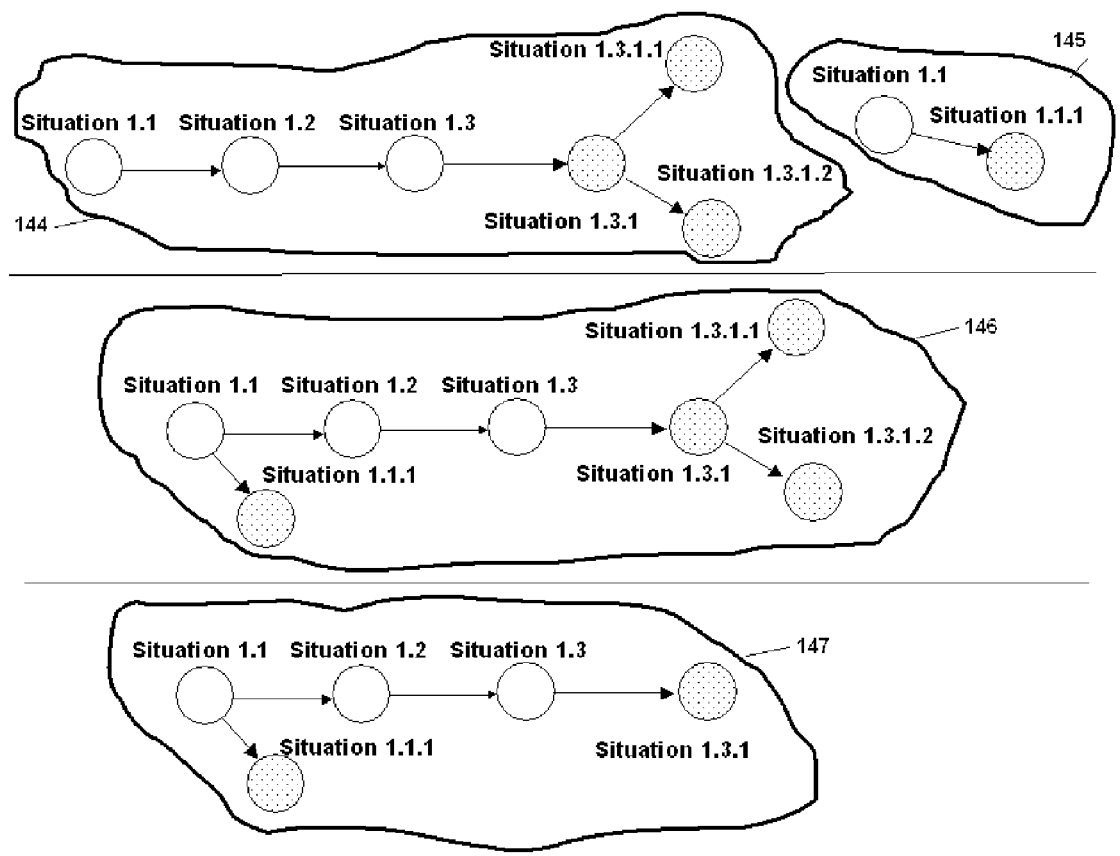
FIG. 24 shows the merging of two STG and pruning an STG.

In FIG. 24, the situation manager in SBM may create and manage multiple STGs. These may be disjoint, or as in the case of STG 144 and STG 145 which share situation 1.1, overlapping. The SM may also combine or merge situations, as in the case of STG 146 which is a merger of the STG 144 and STG 145. The SBM may also remove nodes from an STG, or prune an STG. STG 147 is a pruned version of STG 146 after removal of situation 1.3.1.1, situation 1.3.1.2 and the transitions to these situations from situation 1.3.1.

As will be apparent to those familiar with the art, the invention may be embodied in other specific forms without departing from the spirit or essential characteristics thereof.

Although certain preferred embodiments of the invention have been specifically illustrated and described herein, it is to be understood that variations may be made without departing from the spirit and scope of the invention as defined by the appended claims. Thus all variations are to be considered as part of the invention as defined by the following claims.

What is claimed is:

1. A method for providing situation-based management, the method comprising the steps of:
  receiving a collection of events by an event correlator process running on a machine;
  reducing multiple occurrences of identical events in the collection of events into a single representative event of the identical events;
  assigning additional contextual information to the single representative event to indicate multiple occurrences of the identical events;
  inferring a new event or a new quality of an event from the collection of events by the event correlator process;
  providing the collection of events and the new event or the new quality of an event to a situation manager process running on a machine;
  determining, with the situation manager process, if an existing situation corresponds to the collection of events and the new event or the new quality of an event;
  when an existing situation corresponds to the collection of events and the new event or the new quality of an event, updating the existing situation with information from the collection of events and the new event or the new quality of an event; and
  when an existing situation does not correspond to the collection of events and the new event or the new quality of an event:
  creating a new situation based, at least in part, on the inferred new event or the inferred new quality of an event by the situation manager process, wherein creating the situation includes matching the inferred new event or the inferred new quality of an event with a collection of situation templates in a situation template library, selecting one or more situation templates from the collection of situation templates, and populating the one or more selected situation templates with information from the collection of events and the inferred new event or the new quality of an event to create the new situation; and organizing the situation template library to include the new situation.

2. The method of claim 1, wherein the inferring step is performed by one or more of a table lookup system, a database management system, a rule-based system, a model-based system, a case-based reasoning system, or a neural network system.

3. The method of claim 1, wherein the creating step comprises a retrieve step, an adapt step, an execute step, and an organize step.

4. The method of claim 1, wherein the creating step includes creating a situation using one of a table lookup system, a database management system, a rule-based system, a model-based system, a case-based reasoning system, or a neural network system.

5. The method of claim 1 further comprising a fifth step of providing situations to a situation viewer.

6. An apparatus comprising:
a memory to store a collection of situation templates; and
a first processor running an event correlator process to infer a new event or a new quality of an event from a collection of events; and
a second processor running a situation manager process operatively coupled to the event correlator process to receive as an input the inferred new event or the inferred new quality of an event provided by the event correlator process, the situation manager process including the operations of:
determining if an existing situation corresponds to the collection of events and the inferred new event or the inferred new quality of an event;
when an existing situation corresponds to the collection of events and the inferred new event or the inferred new quality of an event, updating the existing situation with information from the collection of events and the inferred new event or the inferred new quality of an event;
when an existing situation does not correspond to the collection of events and the inferred new event or the inferred new quality of an event, creating a new situation based, at least in part, on the inferred new event or the inferred new quality of an event, wherein creating the new situation includes matching the inferred new event or the inferred new quality of an event with the collection of situation templates stored in the memory, selecting one or more situation templates from the collection of situation templates, and populating the one or more selected situation templates with information from the collection of events and the inferred new event or the inferred new quality of an event to create the new situation;
wherein the event correlator process is further configured to cause the first processor to: reduce multiple occurrences of identical events in the collection of events into a single representative event of the identical events and to assign context information to the single representative event to indicate the multiple occurrences of the identical events.

7. The apparatus of claim 6, wherein the event correlator process is constructed by one or more of a table lookup system, a database management system, a rule-based system, a model-based system, a case-based reasoning system, or a neural network system.

8. The apparatus of claim 6, wherein the event correlator process further provides one or more events from the collection of events to the situation manager process, wherein the situation manager process matches the one or more events with the collection of situation templates.

9. The apparatus of claim 6, wherein the situation manager process updates an existing situation.

10. The apparatus of claim 6, wherein the situation manager process adapts one or more situation templates, executes actions present in one or more situation templates, and organizes one or more situation templates in a situation library.

11. The apparatus of claim 6, wherein the situation manager process is constructed by one of a table lookup system, a database management system, a rule-based system, a model-based system, a case-based reasoning system, or a neural network system.

12. The apparatus of claim 6 further comprising a situation viewer operatively coupled to the situation manager process, and having as an input a collection of situations provided by the situation manager process.

13. The apparatus of claim 6, wherein the first processor and the second processor are implemented in a multi-processor computer.

14. A situation-based management system comprising:
at least one sensor to provide one or more events; and
data processing equipment coupled to the at least one sensor to receive the one or more events; wherein the data processing equipment infers a new event or a new quality of an event from the one or more events provided by the at least one sensor;
wherein the data processing equipment is configured to determine if an existing situation corresponds to the collection of events and the inferred new event or the inferred new quality of an event;
wherein the data processing equipment is configured to update the existing situation with information from the collection of events and the inferred new event or the inferred new quality of an event when an existing situation corresponds to the collection of events and the inferred new event or the inferred new quality of an event;
when an existing situation does not correspond to the one or more events and the new event or the new quality of an event, the data processing equipment is further operable to create a new situation based, at least in part, on the inferred new event or the inferred new quality of an event by matching the inferred new event or the inferred new quality of an event with a collection of situation templates, selecting one or more situation templates from the collection of situation templates; and populating the one or more selected situation templates with information from the one or more events and the new event or the new quality of an event to create the new situation;
wherein the data processing equipment is further configured to: reduce multiple occurrences of identical events in the one or more events into a single representative event of the identical events; and assign context information to the single representative event to indicate that the identical events happened more than once.

15. The situation-based management system of claim 13, further comprising a situation viewer operatively coupled to the data processing equipment to display the situation created by the data processing equipment.

16. The method of claim 1, further comprising one or more of:
reducing the number of events in the collection of events by filtering events in the collection of events based on comparison of characteristics of each respective event with predefined criteria;

temporarily inhibiting delivery of an event in the collection of events to the situation manager process based on the presence of other events, available resources, or management priorities;
counting and thresholding repeated arrivals of identical events; and
assigning a higher value to a parameter of an event in the collection of events based on the number of occurrences of the event.

* * * * *